(12) United States Patent
Hyder et al.

(10) Patent No.: US 7,720,791 B2
(45) Date of Patent: *May 18, 2010

(54) INTELLIGENT JOB MATCHING SYSTEM AND METHOD INCLUDING PREFERENCE RANKING

(75) Inventors: Adam Hyder, Los Altos, CA (US); Changsheng Chen, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/441,638

(22) Filed: May 25, 2006

(65) Prior Publication Data

US 2006/0265268 A1    Nov. 23, 2006

(51) Int. Cl.
G06F 17/30    (2006.01)
(52) U.S. Cl. .................................. 707/4; 707/3; 707/10
(58) Field of Classification Search ...................... 707/3, 707/4, 5
See application file for complete search history.

(56) References Cited

U.S. PATENT DOCUMENTS

| | | | |
|---|---|---|---|
| 5,164,897 | A | 11/1992 | Clark et al. |
| 5,197,004 | A | 3/1993 | Sobotka et al. |
| 5,805,747 | A | 9/1998 | Bradford |
| 5,884,270 | A | 3/1999 | Walker et al. |
| 6,370,510 | B1 | 4/2002 | Mc Govern et al. |
| 6,385,620 | B1 | 5/2002 | Kurzius et al. |
| 6,681,223 | B1 | 1/2004 | Sundaresan |
| 6,701,313 | B1 | 3/2004 | Smith |
| 6,873,996 | B2 | 3/2005 | Chand |
| 6,917,952 | B1 | 7/2005 | Dailey et al. |
| 7,016,853 | B1 | 3/2006 | Pereless et al. |
| 7,043,443 | B1 | 5/2006 | Firestone |
| 7,191,176 | B2 * | 3/2007 | McCall et al. .................. 707/6 |

(Continued)

OTHER PUBLICATIONS

Notification of Transmittal of the International Search Report and the Written Opinion of the International Searching Authority, or the Declaration (PCT/US06/08893).

(Continued)

*Primary Examiner*—Baoquoc N To
(74) *Attorney, Agent, or Firm*—James J. DeCarlo; Greenberg Traurig, LLP

(57) ABSTRACT

A job searching and matching system and method is disclosed that gathers job seeker information in the form of job seeker parameters from one or more job seekers, gathers job information in the form of job parameters from prospective employers and/or recruiters, correlates the information with past job seeker behavior, parameters and behavior from other job seekers, and job parameters and, in response to a job seeker's query, provides matching job results based on common parameters between the job seeker and jobs along with suggested alternative jobs based on the co-relationships and based on ratings and preferences provided by the job seeker and provides negative filtration of undesirable jobs based on job seeker input and in response to queries from the system in order to efficiently and accurately accommodate job seeker perception. In addition, the system correlates employer/recruiter behavior information with past employer/recruiter behavior, parameters and information concerning other job seekers, which are candidates to the employer, and resume parameters, and, in response to a Employer's query, provides matching job seeker results based on common parameters between the job seeker resumes and jobs along with suggested alternative job seeker candidates based on the identified co-relationships and specifies job seekers to be eliminated from displayed results.

19 Claims, 18 Drawing Sheets

U.S. PATENT DOCUMENTS

| | | | |
|---|---|---|---|
| 7,424,438 B2 * | 9/2008 | Vianello | 705/9 |
| 7,487,104 B2 | 2/2009 | Sciuk | |
| 2001/0047347 A1 | 11/2001 | Perell et al. | |
| 2001/0049674 A1 | 12/2001 | Talib et al. | |
| 2002/0002479 A1 | 1/2002 | Almog et al. | |
| 2002/0026452 A1 | 2/2002 | Baumgarten et al. | |
| 2002/0045154 A1 | 4/2002 | Wood et al. | |
| 2002/0046074 A1 | 4/2002 | Barton | |
| 2002/0055867 A1 | 5/2002 | Putnam et al. | |
| 2002/0059228 A1 | 5/2002 | McCall et al. | |
| 2002/0072946 A1 | 6/2002 | Richardson | |
| 2002/0091669 A1 | 7/2002 | Puram et al. | |
| 2002/0111843 A1 | 8/2002 | Wellenstein | |
| 2002/0120532 A1 | 8/2002 | McGovern et al. | |
| 2002/0133369 A1 | 9/2002 | Johnson | |
| 2002/0143573 A1 * | 10/2002 | Bryce et al. | 705/1 |
| 2002/0174008 A1 | 11/2002 | Noteboom | |
| 2003/0009437 A1 | 1/2003 | Seiler et al. | |
| 2003/0023474 A1 | 1/2003 | Helweg-Larsen | |
| 2003/0033292 A1 | 2/2003 | Meisel et al. | |
| 2003/0037032 A1 | 2/2003 | Neece et al. | |
| 2003/0046311 A1 | 3/2003 | Baidya et al. | |
| 2003/0061242 A1 | 3/2003 | Warmer et al. | |
| 2003/0093322 A1 | 5/2003 | Sciuk | |
| 2003/0125970 A1 | 7/2003 | Mittal et al. | |
| 2003/0144996 A1 | 7/2003 | Moore | |
| 2003/0158855 A1 | 8/2003 | Farnham et al. | |
| 2003/0172145 A1 | 9/2003 | Nguyen | |
| 2003/0187680 A1 | 10/2003 | Fujino et al. | |
| 2003/0204439 A1 | 10/2003 | Cullen | |
| 2004/7006447 | 4/2004 | Swauger | |
| 2004/0107112 A1 * | 6/2004 | Cotter | 705/1 |
| 2004/0133413 A1 | 7/2004 | Beringer et al. | |
| 2004/0219493 A1 | 11/2004 | Phillips | |
| 2004/0267554 A1 * | 12/2004 | Bowman et al. | 705/1 |
| 2004/0267735 A1 | 12/2004 | Melham | |
| 2005/0004927 A1 | 1/2005 | Singer | |
| 2005/0050440 A1 | 3/2005 | Meteyer et al. | |
| 2005/0080657 A1 | 4/2005 | Crow et al. | |
| 2005/0080795 A1 | 4/2005 | Kapur et al. | |
| 2005/0210514 A1 | 9/2005 | Kittlaus et al. | |
| 2005/0216295 A1 | 9/2005 | Abrahamsohn | |
| 2005/0228709 A1 | 10/2005 | Segal | |
| 2005/0278205 A1 | 12/2005 | Kato | |
| 2006/0047530 A1 | 3/2006 | So et al. | |
| 2006/0106636 A1 | 5/2006 | Segal | |
| 2006/0116894 A1 | 6/2006 | DiMarco | |
| 2006/0155698 A1 | 7/2006 | Vayssiere | |
| 2006/0178896 A1 | 8/2006 | Sproul | |
| 2006/0229896 A1 * | 10/2006 | Rosen et al. | 705/1 |
| 2006/0265266 A1 | 11/2006 | Chen et al. | |
| 2006/0265267 A1 | 11/2006 | Chen et al. | |
| 2006/0265269 A1 | 11/2006 | Hyder et al. | |
| 2006/0265270 A1 | 11/2006 | Hyder et al. | |
| 2007/0059671 A1 | 3/2007 | Mitchell | |
| 2007/0273909 A1 | 11/2007 | Chen et al. | |
| 2007/0288308 A1 | 12/2007 | Chen et al. | |
| 2009/0198558 A1 | 8/2009 | Chen et al. | |

OTHER PUBLICATIONS

Notification of Concerning Transmittal Of International Preliminary Report on Patentability Authority (PCT/US06/008906).
Notification of Transmittal of the International Search Report and the Written Opinion of the International Searching Authority, or the Declaration (PCT/US06/008907).
Office Action issued in connection with U.S. Appl. No. 11/136,009 mailed on Apr. 1, 2009.
Office Action issued in connection with U.S. Appl. No. 11/441,639 mailed on Mar. 18, 2009.
Office Action issued in connection with U.S. Appl. No. 11/441,639 mailed on Apr. 17, 2008.
Office Action issued in connection with U.S. Appl. No. 11/441,997 mailed on Apr. 17, 2008.
Office Action issued in connection with U.S. Appl. No. 11/441,997 mailed on Oct. 23, 2006.
International Search Report and the Written Opinion in connection with PCT/US06/08893 mailed Sep. 25, 2007.
International Preliminary Report on Patentability in connection with PCT/US06/008906 issued on Sep. 12, 2007.
International Search Report and the Written Opinion in connection with PCT/US06/008907 mailed Oct. 22, 2007.
Office Action issued in connection with U.S. Appl. No. 11/441,639 mailed on Oct. 14, 2008.
Office Action issued in connection with U.S. Appl. No. 11/441,997 mailed on Feb. 19, 2009.
International Search Report (PCT/US07/61162).
Office Action issued in connection with U.S. Appl. No. 11/442,108 mailed on Jun. 18, 2009.
Office Action issued in connection with U.S. Appl. No. 11/441,997 mailed on Aug. 6, 2009.
Office Action issued in connection with U.S. Appl. No. 11/441,639 mailed on Sep. 11, 2009.
Office Action issued in connection with U.S. Appl. No. 11/135,825 mailed on Aug. 18, 2009.
Office Action issued in connection with U.S. Appl. No. 11/135,825 mailed on Mar. 25, 2009.
Office Action issued in connection with U.S. Appl. No. 11/135,825 mailed on Oct. 27, 2008.
Office Action issued in connection with U.S. Appl. No. 11/135,825 mailed on Apr. 29, 2008.
Office Action issued in connection with U.S. Appl. No. 11/135,825 mailed on Dec. 13, 2007.
Office Action issued in connection with U.S. Appl. No. 11/135,825 mailed on Jul. 3, 2007.

* cited by examiner

FIG. 16

INTELLIGENT JOB MATCHING SYSTEM AND METHOD INCLUDING PREFERENCE RANKING

CROSS REFERENCE TO RELATED APPLICATIONS

This application is related to U.S. patent application Ser. Nos. 11/136,009 and 11/135,825, both filed on May 23, 2005, the disclosures of which are incorporated herein by reference in their entirety. This application is also related to U.S. patent application Ser. No. 11/441,997, entitled INTELLIGENT JOB MATCHING SYSTEM AND METHOD, filed on May 25, 2006, and U.S. patent application Ser. No. 11/441,639, entitled INTELLIGENT JOB MATCHING SYSTEM AND METHOD INCLUDING NEGATIVE FILTRATION, filed on May 25, 2006, both of which are co-owned by the assignee of the present disclosure and are hereby incorporated herein by reference in their entirety.

BACKGROUND OF THE DISCLOSURE

1. Field of the Disclosure

The present disclosure relates to computer software. In particular, it relates to a technique for enhancing job search results for both job seekers looking for jobs and employer/recruiters looking for job candidates.

2. State of the Art

A challenge common to most companies seeking talented employees is finding the best set of candidates for the position available. One standard practice among human resource departments is to create a job description for each open position, then advertise the position along with the description. Recruiters and job seekers then have to review and analyze these descriptions in order to determine a match between job seekers and particular jobs.

A number of searching tools are available to a person searching on the Internet for the right job based on his or her skill set. Typical searching tools currently available require the job seeker to select various criteria in the form of keywords, such as desired locations, types of jobs, desired compensation levels, etc. Similarly, the employers provide, in addition to the job description, levels of skill, education, years of experience, etc. required to be considered for a particular job. Searching tools then look up the seeker's keywords in a data base of job descriptions and return, or display those job descriptions that contain the job seeker's keywords.

However, available search tools still either often require the employer and the job seeker to each sift through a large number of so-called search results or can return no search results at all if the criteria provided is too specific or narrow. It would be desirable, then, to provide a matching search tool that more intelligently matches job seekers to potential jobs and intelligently assists in narrowing a job seeker's search for the right job. Such a search and matching tool is also needed to assist an employer/recruiter in matching potential job descriptions to potential job seekers.

SUMMARY OF THE DISCLOSURE

A system and method for matching jobs or employment opportunities with job seekers is disclosed which intelligently narrows search results based on the job seeker's or employer/recruiter's search activity and personalized preferences. The system gathers a job seeker profile of desired and experiential information as job seeker parameters, from a job seeker that accesses the system via a website. Similarly, the system gathers job description information as job parameters from a prospective employing entity such as an employer or recruiter, hereinafter termed an "employer/recruiter." In addition, the system preferably can obtain further job opening information from other employment opportunity sources via a web crawler application so as to have as broad a base of opportunities to present to a job seeker as possible. The system then correlates the available jobs, tracks all job seeker inquiries, and looks for commonalities and correlations between job parameters, interests of job seekers, features of job seeker resumes, past actions of the job seeker, specific preferences of the job seeker, and job descriptions to narrow in on a more accurate set of suggested jobs being presented to the job seeker each time the job seeker queries the system for matching potential jobs. In this way the system and method become more transparent and quickly become personalized to the preferences of the job seeker of the system.

Further, the system and method can be used by an employer/recruiter to similarly match prospective job seekers to an employer/recruiter's job and suggest other job seekers for consideration by the employer/recruiter based on correlations between job parameters, job seeker parameters, employer/recruiter actions, preferences, past actions by the employer/recruiter, interactive queries between the employer/recruiter and the system, and job seeker interest history in order to iteratively narrow the search results to a more accurate set of suggestion job seekers being presented to the employer/recruiter.

An exemplary software system for matching a job seeker with a job includes a job seeker profile builder module connectable to a database operable to generate job seeker profile parameters in response to job seeker input. The system also includes a job profile builder module connectable to the database that is operable to generate job profile parameters in response to employer/recruiter input, a matching module for matching the job seeker to a potential job through finding one or more common parameters between job seeker parameters and job profile parameters and producing matching results, a correlation module operably connected to the matching module for determining a correlation between one of the common parameters and one or more selected parameters related to one of the job seeker, other job seekers and other jobs and determining relevance of the correlation to the matching results. The system also includes a user interface accessible to one of the job seeker and the employer/recruiter for displaying the matching results and alternative jobs. The system further includes, in the correlation module, a personalization module that the job seeker utilizes to modify the correlations and resultant matches in accordance with user ratings, interactive search and/or matching rule modifications, and preferences gleaned from interactions between the job seeker or employer/recruiter user and queries within the correlation module.

An exemplary method for matching a job seeker with one or more of a plurality of jobs preferably includes building a job seeker profile of job seeker parameters in response to job seeker input, building a job profile of job parameters in response to employer input for each of the plurality of jobs, and, in response to a job seeker query, matching the job seeker to a potential job through finding one or more common parameters between job seeker parameters and job parameters and producing matching results. The method also preferably includes tracking popularity of one or more selected job parameters in the matching results based on activity from other job seekers, determining relevance of alternative jobs to the matching results based on the popularity, interactively querying the job seeker to evaluate displayed matching results and provide responses, modifying correlations based on the responses, determining relevance based on the responses, and iteratively displaying re-matching results and relevant alternative jobs for consideration by the job seeker.

An exemplary method for matching a job seeker to a job or jobs includes permitting a job seeker to rate jobs previously presented to him/her in displayed matching results and factoring in received ratings so that subsequent queries by the job seeker takes such ratings into account. Another method for matching a job seeker to a job or jobs includes engaging the job seeker in interactive evaluation to refine matching rules and ranking user preferences established through ranking queries provided to the job seeker. These preferences are then utilized in the system such that listing generation for subsequent display of results provided to the job seeker appears more focused and transparent to the job seeker or employer/recruiter utilizing the system, thus permitting the job seeker or employer/recruiter to more quickly focus on personally preferred opportunities.

BRIEF DESCRIPTION OF THE DRAWINGS

Various embodiments are disclosed in the following detailed description. The disclosure will be better understood when consideration is given to the following detailed description taken in conjunction with the accompanying drawing figures wherein:

FIG. 16 is a screen shot of a user interface presented to a job seeker providing search results.

DETAILED DESCRIPTION

Figure 1:
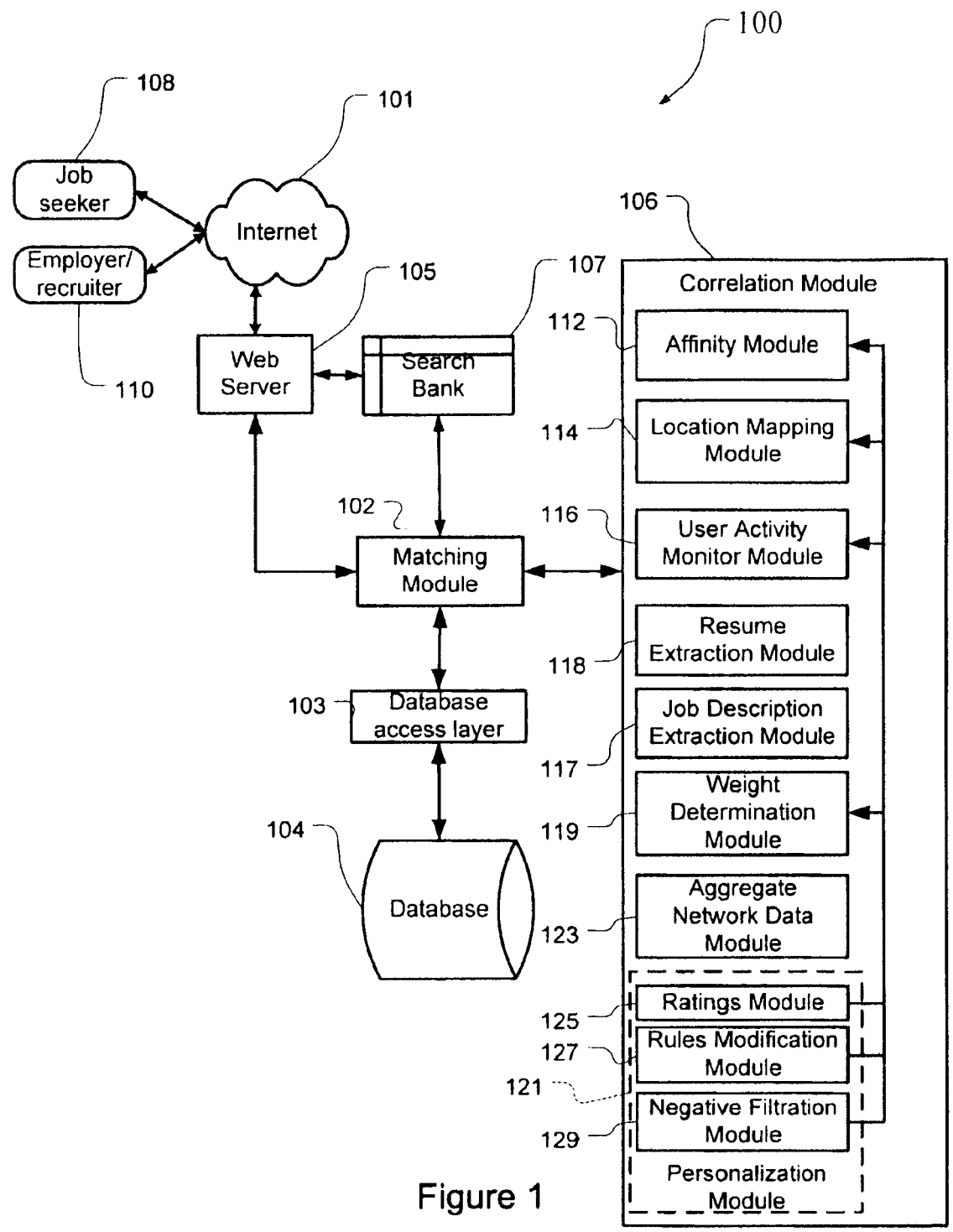
FIG. 1 shows an overall system view of an illustrative embodiment of a job matching system incorporating features of the present disclosure.

Throughout this specification and in the drawing, like numerals will be utilized to identify like modules, operations and elements in the accompanying drawing figures.

A block diagram of one exemplary embodiment of the job search architecture software system 100 is shown in FIG. 1. The system 100 includes a matching module 102, a database 104, and a correlation module 106. As described herein, modules refer generally to functional elements that can be implemented in a centralized or distributed manner so that features or functions described in an exemplary manner as associated with one or more modules can be located or can take place or be carried out in other modules or at other locations in the system.

The matching module 102 receives information and queries via a job seeker interface module 108 and employer/recruiter interface module 110 through accessing a web server 105 typically via the internet 101. Throughout this specification description, primarily an exemplary job seeker will be used to describe system operations. However, this is not the only use of the system 100. The system 100 preferably can also be used for example, in a reverse direction, by an employer/recruiter to evaluate candidate job seekers in a similar manner.

The web server 105 in turn communicates preferably through a search bank 107 to the matching module 102 which draws from the correlation module 106. The correlation module 106 incorporates a number of modules which gather and catalog information from within the system 100 and other sources outside the system 100 to provide specific services to the matching module 102 for correlating information contained in the database 104 and coordination with information from other sources.

The correlation module 106, for example, preferably includes one or more of an affinity engine module 112, a location mapping module 114, a user activity monitor module 116, a resume extraction module 118, a job description extraction module 117, and a weight determination module 119. The correlation module 106 can optionally also incorporate other modules. The modules 112, 114, 116, 117, 118, 119, 121, and 123 are merely exemplary of one embodiment illustrated. The correlation module 106, in general, incorporates modules that provide information or contain routines that look for relationships between various data and draw inferences from the data that correlate with information provided, either directly or indirectly, from the job seeker and/or the employer/recruiter.

The affinity engine module 112 within the correlation module 106 generally examines combinations of informational parameters or data to determine whether there are any correlations, i.e. affinities between any of the parameters. Such affinities preferably relate a job seeker to other job seekers based on, for example, a particular location, a job, skill set, job categories, spatial relationships, etc. Similarly, jobs can also be related to other jobs. In general, the affinity module 112 is used to identify commonalities and trends between otherwise disparate data. This information can then be utilized to identify alternative jobs to the job seeker or alternative job seeker candidates to an employer/recruiter user of the system 100 that otherwise might be missed.

The location mapping module 114 converts locations of jobs input by employers/recruiters and desired work location input by job seekers into "geocodes," specifically latitude and longitudinal coordinates such that distances between locations and relative spatial positions between jobs and job seekers can be easily manipulated and compared to determine relative distances between locations. The information provided by the location mapping module 114 can be used by the matching module 102 or one of the other modules within the correlation module 106.

The user activity monitor module 116 tracks, for each job seeker, and each employer/recruiter, his or her behavior, e.g., prior queries, choices, actions and interactions with the system 100 so as to be able to draw correlations, e.g., inferences from such actions. For example, a job seeker can apply for, or otherwise express an interest in one of a number of suggested jobs. This "apply" fact is tracked for potential use in the affinity engine module 112 to infer other potential matches to offer as suggested jobs. Note that throughout this specification, the term "apply" is used. This term is synonymous and interchangeable with an expression of interest. Similarly, an employer/recruiter can examine resumes and indicate or otherwise express an interest in or contact for interview one of a number of suggested job seekers for a particular job. This indicated interest fact, or behavior, is tracked in the user activity monitor module 116, for use by the affinity engine module 112 when the employer/recruiter next queries the system 100.

The job description extraction module 117 is a tool for extracting key information from job descriptions, and other textual content, parameters such as job titles, skills required or recommended, prior experience levels, etc. There are a number of commercially available text extraction engines that can be used. For example, Resumix Extractor, now marketed by Yahoo Inc., described in U.S. Pat. No. 5,197,004 is one such engine that can be incorporated into and utilized by this module 117.

Similarly, the resume extraction module 118 is a tool for extracting key information from resumes, and other textual content, parameters such as job titles, skills required or recommended, prior experience levels, etc. Again, there are a number of commercially available text extraction engines that can be used. For example, Resumix Extractor, now marketed by Yahoo Inc., described in U.S. Pat. No. 5,197,004 is one such engine that can be incorporated into and utilized by this module 118.

The weight determination module 119 preferably incorporates an adaptive learning engine and optionally can be tunable by the system operator, the job seeker, the employer/recruiter, or other system user. This module 119 can essentially optimize weighting factors to be applied to the various parameters in order to tune or more accurately hone in on desired matched jobs or resumes based on input from the other modules in the correlation module 106.

The Personalization module 121 examines what preferences the jobseeker or employer/recruiter has on his display screen to make inferences from. For a hypothetical example, if the jobseeker has stock ticker banners overlaying his/her window and New York weather site being monitored, the personalization module would provide this information so that the system 100 might infer a tendency toward the northeast United States and possibly a preference for the financial and business related industry positions and factor that correlation into the suggestions that may be made to the job seeker.

The personalization module 121 may, for example, include a ratings module, a rules modification module and a negative filtration module, each designed to help the job seeker, or employer/recruiter refine and hone his or her preferred search criteria by interactively obtaining from the job seeker subjective information that might not otherwise be provided. The rating module 125 provides a mechanism for the system 100 to understand the relative value to the job seeker of recommendations provided and thus more accurately direct affinities that can be drawn. The rules modification module 127 may give the job seeker an opportunity to select or provide search criteria that he or she might not otherwise intuitively provide that can help enhance the experience for the job seeker. The negative filtration module 129 can similarly provide a simple mechanism for the job seeker to eliminate those recommendations that he or she views as outside the realm of interest. These modules all enhance the transparency of the system 100 to the job seeker or employer/recruiter user so that each feels like the system is customizable to their needs. The personalization module 121 is shown as a dashed box since the enclosed modules 125, 127 and 129 may optionally be separately provided or integrated into the personalization module 121.

The Aggregate network data module 123 queries other sources on the network to which the system 100 has access for any information related to the jobseeker. This module helps fill in details on the job seeker or employer/recruiter from other available sources for relevant information that may be used to make correlations.

Job Seeker information is preferably developed in a Job Seeker Profile Builder module 200 within the job seeker module 108. Employer/recruiter job information is preferably developed in a Job Profile Builder module 202 within the Employer/Recruiter module 110. These two builder modules, shown in FIG. 2A, essentially provide tabular data as input to the matching module 102 while at the same time storing the profile informational parameters in the database (DB) 104.

Figure 2A:
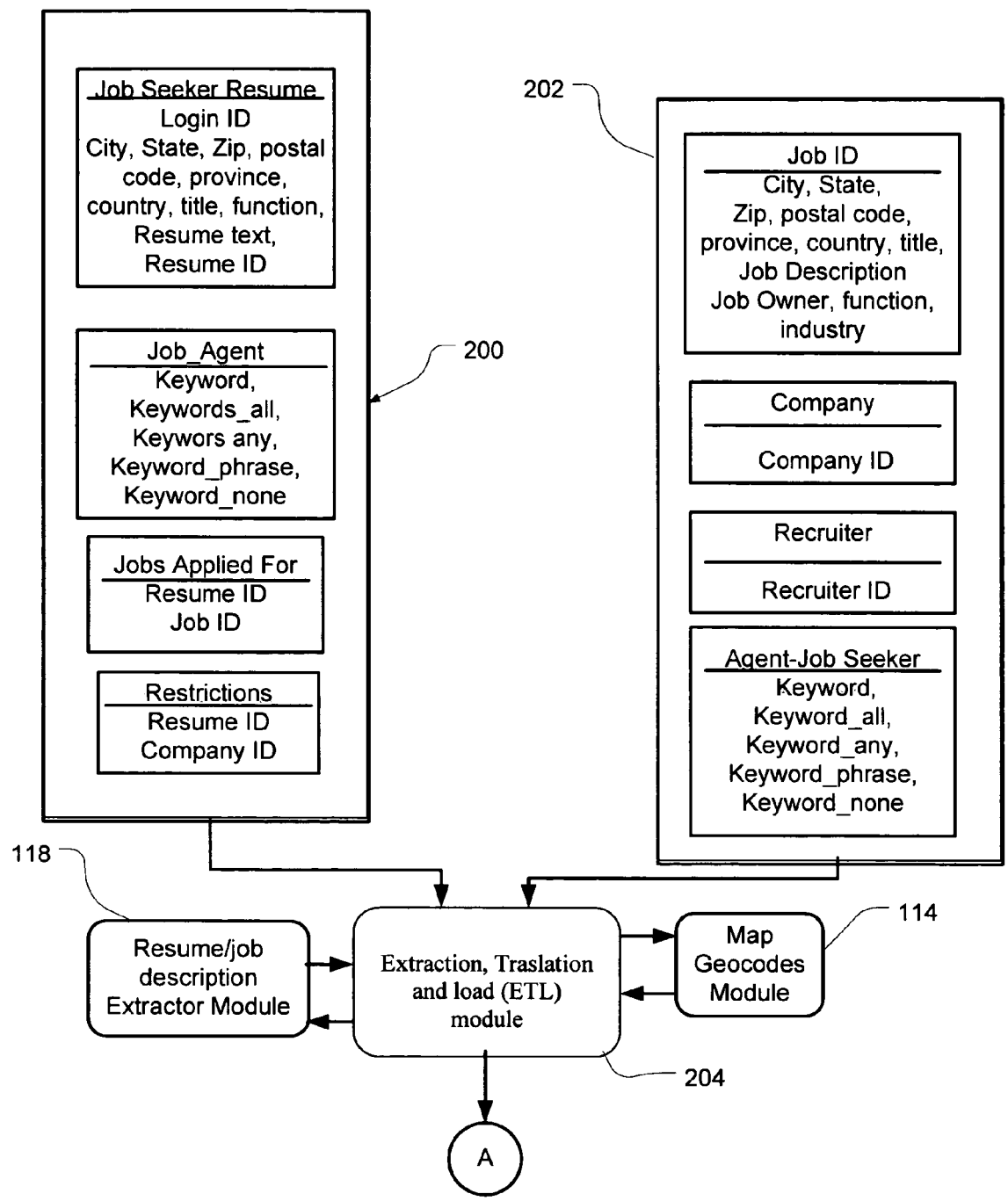
FIGS. 2A and 2B are a high level process flow diagram for a simple illustrative embodiment incorporating features of the present disclosure.
Figure 2B:
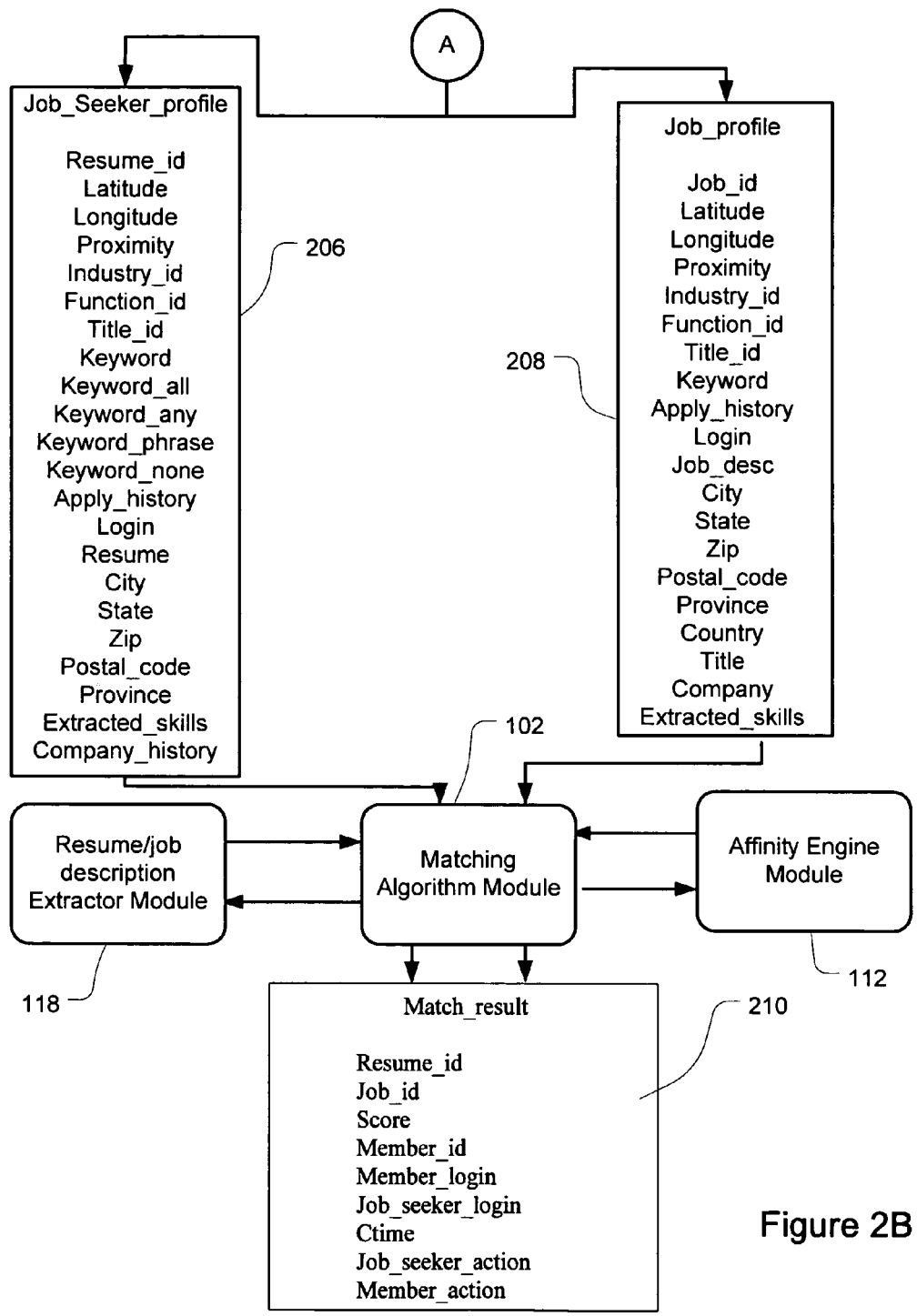

More particularly, the profile builder modules 200 and 202 feed the information obtained from the job seeker or the employer/recruiter, such as the job seeker's city, state, login ID, etc, and employer/recruiter provided job description information such as the job city, state, zip code, company name, job title, etc into an Extraction, Translation and Load (ETL) module 204 as shown in FIG. 2A. This ETL module 204 optionally can require input and translation of the input data from the resume extraction module 118 and from the location mapping module 114 in order to extract and load the information on the job and the job seeker properly into the database 104 as a job seeker profile 206 and a job profile 208 as is shown in FIG. 2B. Once the profiles 206 and 208 are generated and stored in the database 104, the profiles are processed in the matching module 102 to produce match results 210 into the matching module 102.

In one embodiment, the job seeker profile builder module 200 queries a job seeker, or the job seeker's person table, for some or all of the following information and then constructs a job seeker profile 206. Exemplary entries in this profile 206 are described generally as follows:

a. Location. This is the job seeker's desired location. Including the city, state, country and zip code.

b. Proximity preference. This parameter is a number. The user will enter this information or it can be imported from a mapping software product.

c. Industry. This information can be directly inputted by the job seeker or obtained from a person table previously generated by the job seeker and stored in the database 104.

d. Function. The function is the overall activity of the desired job that the job seeker is looking for. This information is obtained from the person table or directly inputted by the job seeker.

e. Title. This is the title of the desired job, if any, and is preferably obtained from the job seeker directly or from his/her person table, or it can be obtained from the job seeker's resume text through an extraction program in the extraction module 118. In this case the title can correspond to the job seeker's most recent job title listed in his/her resume text.

f. Past search criteria. For saved search, this information is preferably stored in a job_agent table. For an ad-hoc search, the search bank 107 where all data that is yet to be searched is queried. This includes keywords used the job seeker has used in prior searches as well as other indicators detailing prior behavior of the job seeker on the system 100.

g. Apply (expression of interest) history. The job seeker's prior job application/interest history information is logged and updated in the user activity monitor module 116 each time the job seeker applies for a job utilizing this software system 100. This information is preferably obtained from the job seeker's "jobs applied for" table, which is a table primarily containing the job seeker's resume ID and the applied for job ID and preferably includes a timestamp.

h. Click-throughs. This information comes from the user activity monitor module 116 which tracks all activity of the job seeker on the system 100, particularly sequential clicking activity, e.g. tracking action of how the job seeker got to the application stage, for example.

i. Resume ID. This is the same field as pindex in the person table. This is a unique identifier for a particular resume corresponding to a particular job seeker. There can be several different resumes submitted by a single job seeker, depending on the one or more industries the job seeker is interested in.

j. Login ID. This field has the job seeker's username. This field is also put into the "match_result" table for fast access.

An exemplary Job seeker database table called "job_seeker_profile" is illustrated in Table 1 below.

TABLE 1

| Column Name | Description | Nullable |
|---|---|---|
| Resume_id | Unique identifier for a resume | N |
| Latitude | xxx.xxx | Y |
| Longitude | yyy.yyy | Y |
| Proximity | Number of miles within the desired location. | Y |
| Industry_id | Unique identifier for a industry | Y |
| Function_id | Unique identifier for a job function | Y |
| Title_id | Unique identifier for a job title. Extractor can be used to extract out the title. | Y |
| keyword | Past search criteria saved by the user. | Y |
| Apply_history | Apply history. This can be comma-separated job Ids. All jobs that are "similar" to those in the apply history should be in this list. Preferably obtained through the Activity monitoring module 116 | Y |

TABLE 1-continued

| Column Name | Description | Nullable |
|---|---|---|
| Click_throughs | Job seeker click-throughs. This could be comma-separated job Ids. Preferably obtained through the Activity monitoring module 116 | |
| login | login id | N |
| resume | Resume text | |
| Keyword_any | Past search criteria saved by the user. Match any of the words. | |
| Keyword_all | Past search criteria saved by the user. Match all of the words. | |
| Keyword_phrase | Past search criteria saved by the user. Match the exact phrase. | |
| Keyword_none | Past search criteria saved by the user. Match none of the words. | |
| City | | |
| State | | |
| Zip | | |
| Province | | |
| Country | | |
| title | This is the real title. | |
| Extracted_skills | Extracted from the job seeker's resume using the Resume extraction module 118. | |

Note that, to handle titles easily and simply, all real job titles are preferably mapped to a set of predefined titles. In this table 1 above, the title column is the original title. The same approach is done for job_profile 208 described below.

The Job Profile 208 preferably can include the following components.

a. Location. This is the job location. It is obtained from a job table in the database 104 or from the employer/recruiter module 110.

b. Proximity preference. This parameter is a number representing the general range of living locations within a reasonable distance from the job location.

c. Industry. This information comes preferably from a job table in the database or can be provided by the employer/recruiter.

d. Function. This info is preferably obtained from the job table in the database 104 or can be provided by the employer/recruiter module 110.

e. Title. This is obtained from job table database or can be provided by the employer/recruiter module 110.

f. Past search criteria. For previously saved searches, this information is stored in an "agent_person" table in the database 104.

g. employer interest history. This information is either null or can be obtained from the user activity monitor module 116, or a Jobs Applied for table in the database 104.

h. Click-throughs. This can be obtained from the User activity monitor module 116 which tracks the history of the actions taken by the user, a job seeker or an employer/recruiter.

i. Job description analysis. This information can be provided by the Employer/recruiter, previously stored in database 104 in a job table, or can be obtained through the resume extraction module 118.

j. Job ID. This is the ID for this job.

k. User ID. This is the user account id.

The Job Profile builder 202 performs the same functions as the job Seeker profile builder, in that the data is obtained from the employer/recruiter to complete the job profile. Similarly, a sophisticated keyword/phrase extractor such as "Resumix Extractor" marketed by Yahoo Inc. and described in U.S. Pat. No. 5,197,004 can be used to extract job titles from the job description and extract out skills for the extracted skills column.

An exemplary Job Profile table is shown below in Table 2.

TABLE 2

| Column Name | Description | Nullable |
| --- | --- | --- |
| Job_id | Unique identifier for a job | N |
| Latitude | | Y |
| Longitude | | Y |
| Proximity | Number of miles within the desired location. | Y |
| Industry_id | Unique identifier for a industry | Y |
| Function_id | Unique identifier for a job function | Y |
| Title_id | Unique identifier for a job title. Extractor can be used to extract out the title. | Y |
| Past_search | Past search criteria saved by the user or ad-hoc search performed by the user. | Y |
| Interest_history | Employer interest history. This can be comma-separated resume IDs. All job seeker resumes that the employer/recruiter has expressed interest in can be in this list. This is preferably obtained through the use of the user activity monitoring module 116 | Y |
| Click_throughs | Recruiter click-throughs. This could be comma-separated resume Ids. This is preferably obtained through the use of the user activity monitoring module 116 | |
| user_id | Owner of the job | Y |
| login | Employer/recruiter login id | Y |
| City | | |
| State | | |
| Zip | | |
| Province | | |
| Country | | |
| Title | The original title | |
| company | The company name | |
| Extracted_skills | Extracted from job description using the job description extraction module 117. | |

The job profile data and the job seeker profile data are then fed to the matching module 102. In the exemplary embodiment shown in FIG. 2, the matching module 102 draws information from one or more of the modules 112-119, and, for example, from the affinity engine module 112 to generate a set of matching results 210.

Figure 3:
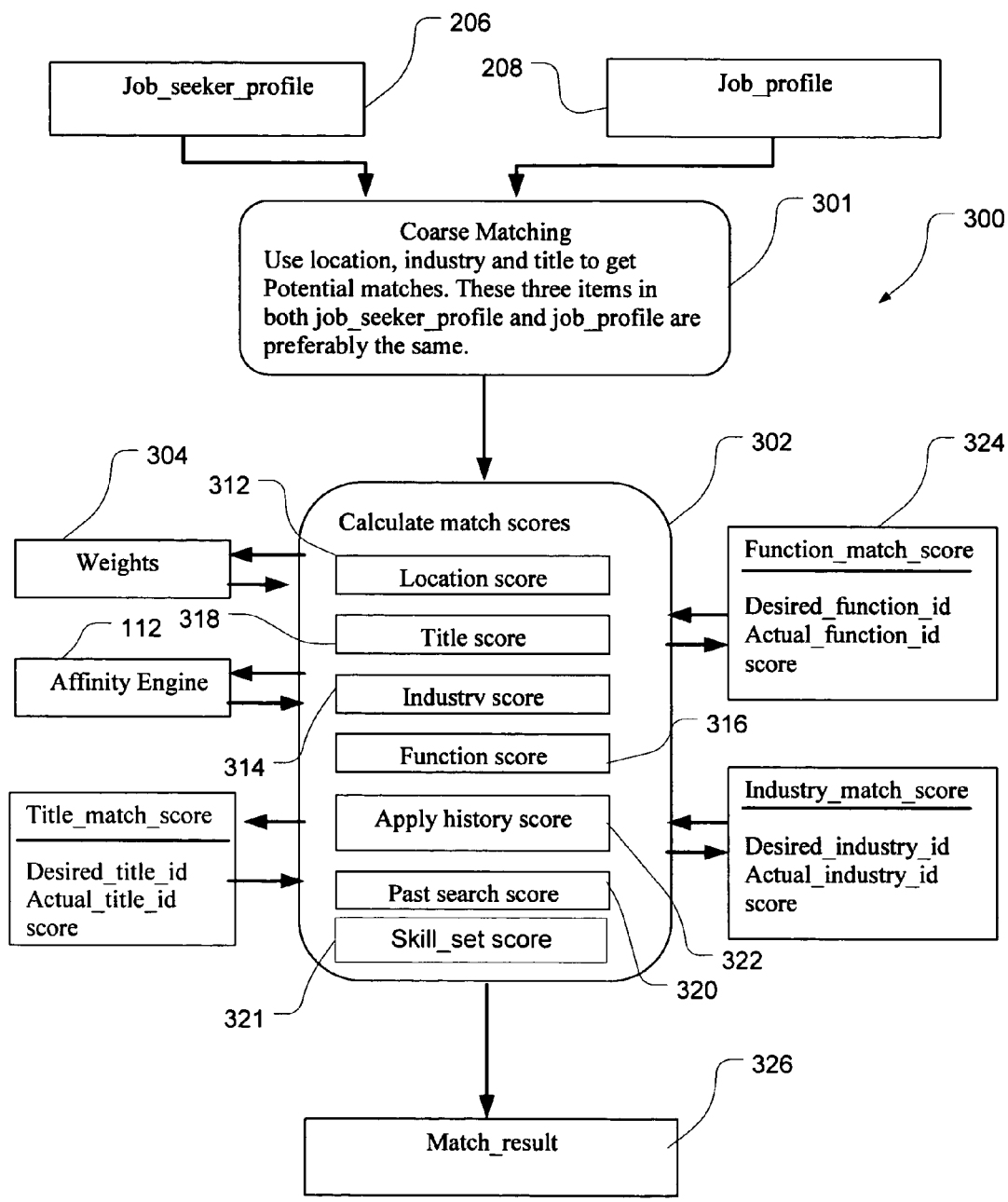
FIG. 3 is a process flow diagram for a matching module in an illustrative embodiment incorporating features of the present disclosure.

An embodiment of the matching algorithm 300 used in the matching module 102 is shown in FIG. 3. In this exemplary embodiment, the matching algorithm 300 involves a two step approach. First, one or more of the location, industry, and title from the job seeker profile 206 and the location, industry, and title from prospective job profiles 208 are retrieved from the database 104 and evaluated in a course matching operation 301. To simplify location and proximity comparisons in this first operation 301, locations preferably have been converted in the location mapping module 114, or alternatively directly by the job seeker input or the employer/recruiter input, to geo-bound numbers so that when latitude and longitude are within the bound, the distance is approximately within the proximity range desired. The operation 301 provides a narrowing of the number of potential matches to those that have an identity between corresponding locations, industries, and title. It is to be understood that other criteria can be utilized in the coarse matching operation 301 such as function instead of title, etc., but for this example, identity between these three parameters will be used for illustration purposes only.

Given a job seeker (lat, lon, proximity, industryValue and titleValue), an exemplary SQL query to find all potential job matches is:

```
Sql = select * from job_profile j where
    Abs(lat − j.latitude) < geoBound and abs(lon − j.longitude) < geoBound
        and IndustryValue in (select value from industry_match jm where
        j.industry_id = jm.industry_id) and titleValue in (select value from
    title_match jm where j.title_id = jm.title_id)
```

Note that, in this particular example, an exact match is required in operation 301 so the query in the first step will be (given a job seeker: lat, lon, proximity, industryId, titleId):

```
Sql = select * from job_profile j where
    Abs(lat − j.latitude) < geoBound and abs(lon − j.longitude) < geoBound
        and IndustryId = j.industry_id and TitleId = j.title_id
```

Control then transfers to matching operation 302.

In matching operation 302, a detailed match is made between the job seeker profile 206 against this reduced list of potential jobs. This detailed matching operation 302 in this exemplary embodiment involves using the following formula given a job seeker profile 206 and each job profile 208:

$$S = LW*L + IW*I + FW*F + TW*T + SW*S + JW*J + AW*A + KW*K$$

Where:
S is the total matching score
LW is a weight given to the location parameter.
L is the location matching score 312.
IW is a weight given to the industry factor.
I is the industry matching score 314.
FW is a weight given to the job function factor.
F is the job function factor 316.
TW is a weight given to the title parameter.
T is the title matching score 318.
SW is a weight given to the past search factor.
S is a past search matching score 320.
JW is a weight given to the apply history for the job seeker and click-throughs parameter.
J is the apply history and click-throughs matching score 322.
AW is a weight given to the resume/job description text matching parameter.
A is the resume/job description matching score 324.
KW is a weight given to the skill set matching score.
K is the skill set matching score 321.

Each of the weights 304 that are used is a value that initially is one and can be varied based on user prior activity history, determined in activity monitoring module 116 or can be tunable by the job seeker or employer/recruiter user or system operator, whoever is using the system 100 at the particular time using the weight determination module 119 shown in FIG. 1.

Each of the matching scores 312-324 is preferably determined in a particular manner exemplified by the following descriptions of an exemplary embodiment. The location matching score "L" (312) is calculated according to the following formula: L=1−D/P where D is the distance between the desired location by the jobseeker and the actual job location and P is the Proximity parameter given in the job seeker or job profile tables. When L is negative, the location is out of range, which means they do not match. The score is linearly reduced with the distance. One is the highest score, when the distance is zero.

The Industry matching score 314 is calculated according to a matrix in which I=IndustryMatchMatrix (DesiredIndustry, ActualIndustry). An example is given using the following Table 4 below.

TABLE 4

|  | Banking | Finance | Software Eng. | Prog. Analyst |
|---|---|---|---|---|
| Banking | 1 | 0.5 | 0 | 0 |
| Finance | 0.5 | 1 | 0 | 0 |
| Software Eng. | 0 | 0 | 1 | 0.6 |
| Prog. Analyst | 0 | 0 | 0.6 | 1 |

In Table 4, assume for a particular match scenario between a job seeker and a job is that the desired industry is banking and the actual job industry is also banking. In this case, the industry match score would be 1. However, if the desired industry is a programmer analyst and the industry is banking, the industry match score would be zero. Similarly, if the job seeker's desired industry is a software engineer and the job industry is programmer analyst, the industry match score would be weighted more toward a match, thus 0.6 would apply because there are numerous similarities between these industries. The actual industry matching table is many orders of magnitude larger than Table 4, but the philosophy behind table development is the same.

The function matching score "F" (316) and the Title matching score "T" (318) are preferably determined utilizing matrix tables similar in design to that of Table 4 above, but it will be recognized that techniques other than tabular matrices can be employed.

The past search matching score "S" (320) may or may not apply. If a job seeker has saved searches, then this term will apply. This score S (320) is determined by S=Number of matching terms/minimum of: number of terms for the job seeker or number of terms for the employer/recruiter. Thus, if only the job seeker has a saved search, then if keywords are present, search keywords against the job description. Then S=number of matching terms/number of terms.

If only the employer/recruiter has a saved search, then a search is made of keywords in the resume text and S=number of matching terms/number of terms in the job seeker resume text.

The apply history and click-through matching score 322 is generally calculated using the affinity engine 112 and the user activity monitoring module 116. The affinity engine generates an affinity file using data from a "jobs applied for" (expression of interest) file as described in more detail below with reference to Table 5. This file tracks all jobs for which the job seeker has applied for or otherwise expressed an interest in. Note that a "click-through," in this exemplary embodiment being described, is determined in the user activity monitoring module 116 and tracks every job seeker action, such as when a job seeker "clicks through" from one screen to another, selects something to view, enters information, or applies to a job. In the case of an employer/recruiter user, the apply history and click through matching score 322 is really a candidate job seeker interest history and click through matching score. In this latter case, the actions of the employer/recruiter user are tracked and employer/recruiter's indicated interest in a candidate job seeker is logged in the activity monitor module 116. Thus the click through is a path history of how the employer/recruiter reached the conclusion to conduct an interview or pass on a resume of interest to the appropriate personnel manager. This information is tracked so that his/her reasoning and preferences can be deduced.

The affinity module preferably can utilize an affinity engine such as is described in U.S. Pat. No. 6,873,996, assigned to the assignee of the present disclosure and hereby incorporated by reference in its entirety. The affinity engine operation in affinity module 112 to determine the matching score 322 can be simply understood with reference to an example set forth in Table 5 below, and the description thereafter.

TABLE 5

| Job Seeker | Applied for Job |
|---|---|
| P1 | J1 |
| P2 | J2 |
| P3 | J1 |
| P4 | J2 |
| P5 | J1 |
| P6 | J1 |
| P7 | J2 |
| P8 | J1 |
| P9 | J2 |
| P2 | J1 |
| P4 | J1 |
| P6 | J2 |
| P8 | J2 |
| P10 | J2 |
| P11 | J2 |
| P1 | J3 |
| P1 | J4 |
| P2 | J3 | a. Job1 to job2 affinity is defined as follows: a=J12/J1, where J12 is the number of applicants who applied for both job1 and job2, J1 is the number of applicants who applied for job1.

b. Job1 to Job2 normalized affinity is defined as follows: n=a/(J2/N), where a is Job1 to Job2 affinity, J2 is the number of applicants who applied for Job2, N is the total applicants. Note that N is a common factor, so it can be taken out.

The score=# of multiple applies "m" divided by J1 applies times J2 applies. Thus, In this Table 5, job seekers P1, P2, P3, P4, P5, P6 and P8 each applied for the job identified as "J1." Thus the affinity for J1 is a Total number: 7. Job seekers P2, P4, P6, P7, P9, P8, P10 and P11 applied for J2. Total number: 8. Note that job seekers P2, P4, P6 and P8 applied for both jobs J1 and J2. Total number: 4.

Therefore J2 is a recommendation for J1 with a score of 4/(7×8)=0.07.

J1 is a recommendation for J2 with a score of 4/(8×7)=0.07.

J3 is a recommendation for J1 with a score of 1/(1×7)=0.14.

This same exemplary apply history can also generate affinities for job seeker (candidates) so that system 100 can make recommendations for employers/recruiters. For example, P1 applied for J1, J3 and J4. P2 applied for J1, J2 and J3. P1 and P2 both applied for J1 and J3. So P1 is a recommendation for P2 with a score of 2/(3×3)=0.33.

Each of the match scores is calculated in operation 302. As discussed above weights can also be factored into each individual score from operation 304. The affinity engine module 112 is used, as an example, in the apply history score determination. As mentioned above, in this particular example, the title match score determination operation 306, the industry match score determination operation 310 and the location match score are required to match at a value of one.

The results of the match operation are stored in the database 104 in a match_result table 326, an example of which is shown in such as Table 6 below.

TABLE 6

| Column Name | Description | Nullable |
|---|---|---|
| Resume_id | Resume ID | N |
| Job_id | Job ID | N |
| Member_id | Member ID | N |
| SCORE | Matching score | N |
| CTIME | Created time stamp | N |
| SHOWN_TO_CANDIDATE | This job is displayed on the job seeker's home page | N (Two valid values: Y, N. Default to N.) |
| CANDIDATE_CLICKED_TIME | The time when the candidate clicked this link. | Y |
| SHOWN_TO_MEMBER | This resume is displayed on the member's home page. | N (Two valid values: Y, N. Default to N.) |
| MEMBER_CLICKED_TIME | The time when the member clicked this link. | Y |
| Member_login | | Y |
| Job_seeker_login | | N |
| Industry: create an industry table as follows: | | |
| Industry_id | Number | N |
| Industry_name | varchar | N |
| Industry: create a function table as follows: | | |
| function_id | Number | N |
| function_name | varchar | N |
| Industry: create a title table as follows: | | |
| titley_id | Number | N |
| title_name | varchar | N |

When a job seeker, or an employer/recruiter, logs in to the system 100, all jobs he/she ever applied for are retrieved from database 104, ordered by date. In the case of the employer/recruiter, all candidate job seekers marked by the employer/recruiter as being of interest to the employer/recruiter are retrieved in a similar manner. The correlation module 106 then is utilized in conjunction with the matching module 102 to identify potential other jobs (or other candidates) based on his/her applied for history (or employer interest history).

Figure 4:
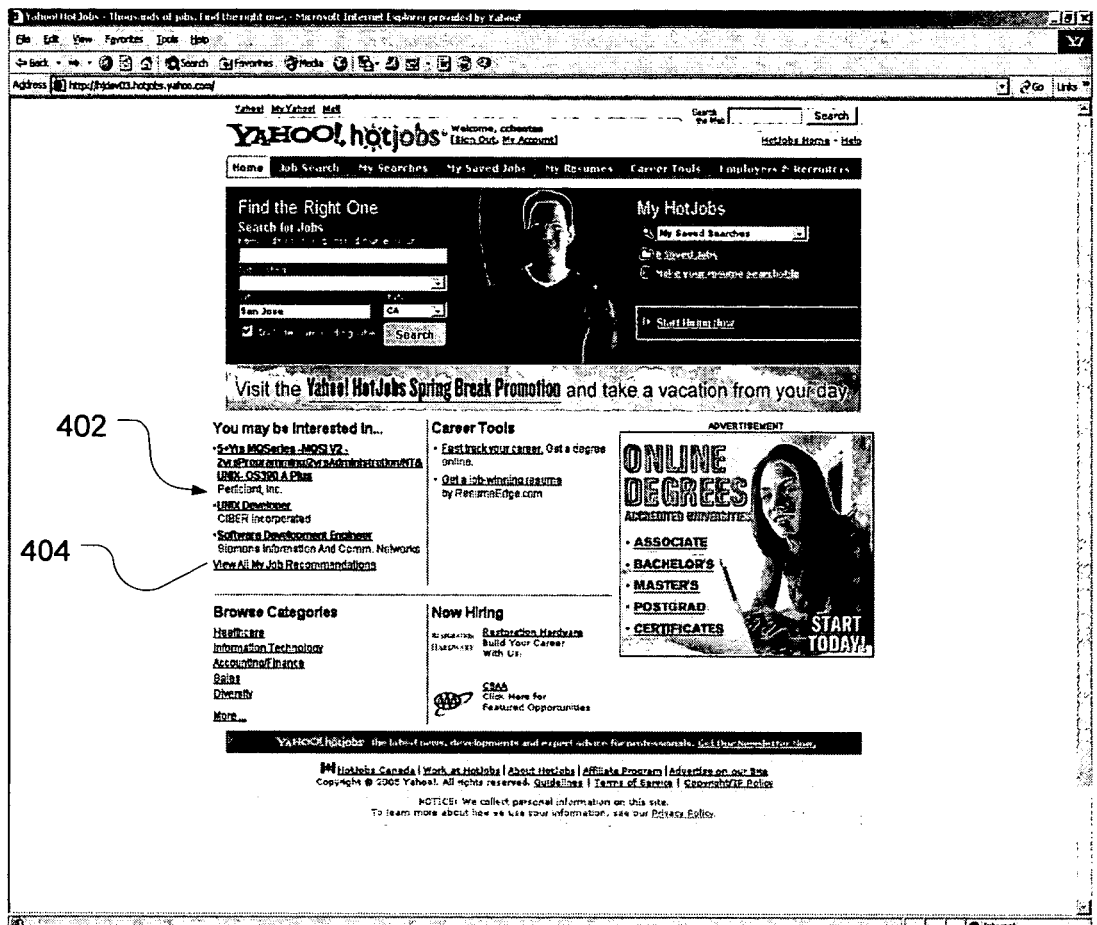
FIG. 4 is an exemplary web page screen that is preferably presented to a job seeker in an illustrative embodiment incorporating features of the present disclosure.
Figure 5:
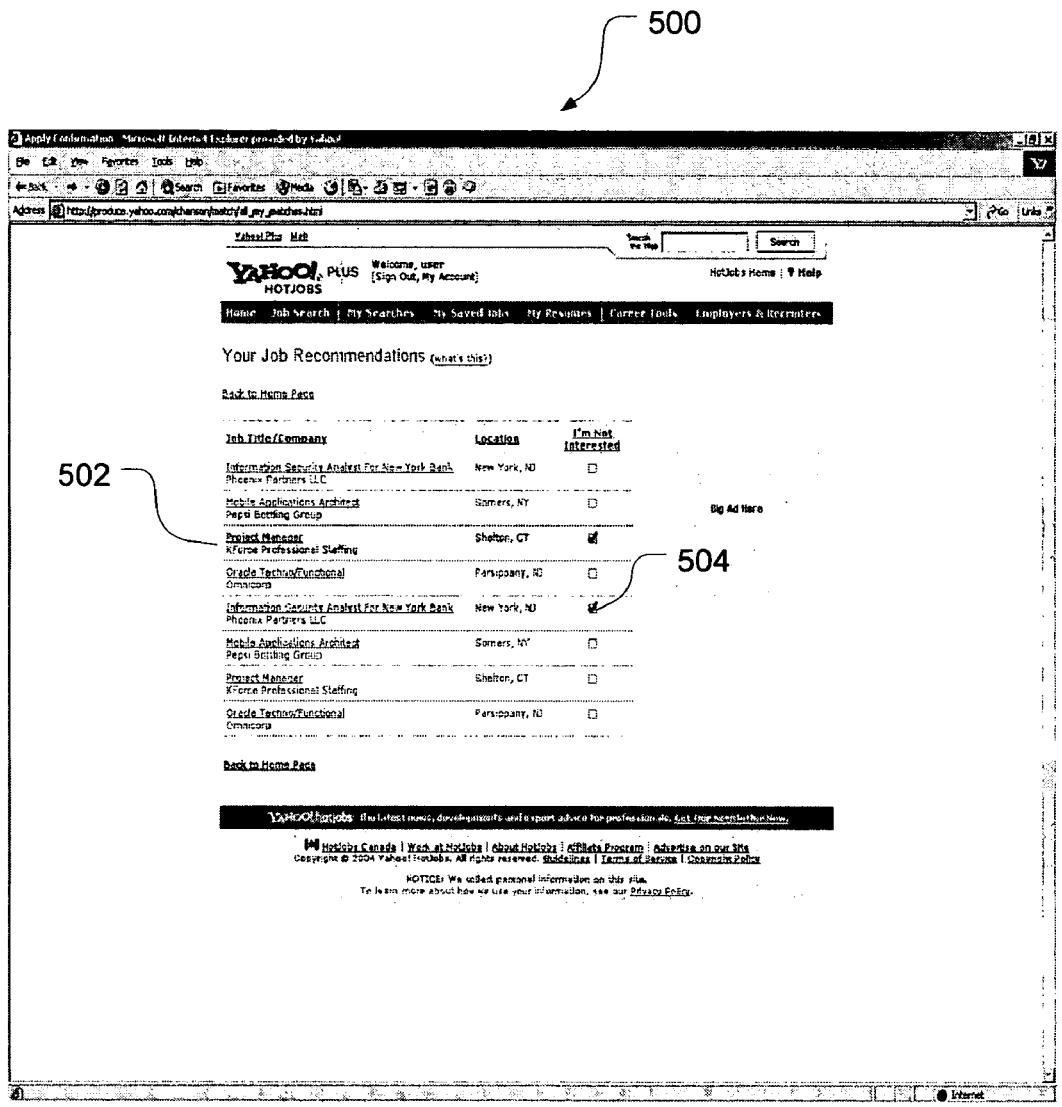
FIG. 5 is an exemplary web page screen preferably presented to the job seeker upon selecting a "View All my Jobs Recommended" in FIG. 4.

A screen shot 400 of an exemplary job seeker web page is shown in FIG. 4. In FIG. 4, the job seeker, in this case an individual who has signed on previously and has applied for jobs via the system 100 which have been saved, is presented with other jobs 402 that he might be interested in. If the job seeker then clicks on the "View All My Job Recommendations" 404, the screen 500 shown in FIG. 5 is presented. Here there are eight jobs 502 presented to the job seeker along with a series of potential selections 504 for him to choose those positions that he/she is not interested in. When the job seeker places a check 506 in one of these boxes as shown, this action is tracked and saved in the user activity monitor module 116. This job and its associated parameters will no longer be considered in the matching module 102, although the parameters will be considered when handled in the user activity monitor module 116 in future search results. No jobs marked "not interested" by a job seeker will show to the job seeker in subsequent queries. Also, all applied jobs and saved jobs will not be recommended again to the job seeker. A new column called "jobsnotinterestedids" is added to the user profile table to store all the job ids that the user is not interested in.

Similarly, if an employer/recruiter checks a "not interested" block for a particular job seeker candidate, in a corresponding screen, that particular job seeker will no longer show to the employer/recruiter in any subsequent queries. A corresponding column called "candidatesnotinterestedids" would be added to the employer/recruiter profile table to store all the job seeker IDs that the user is not interested in.

Figure 6:
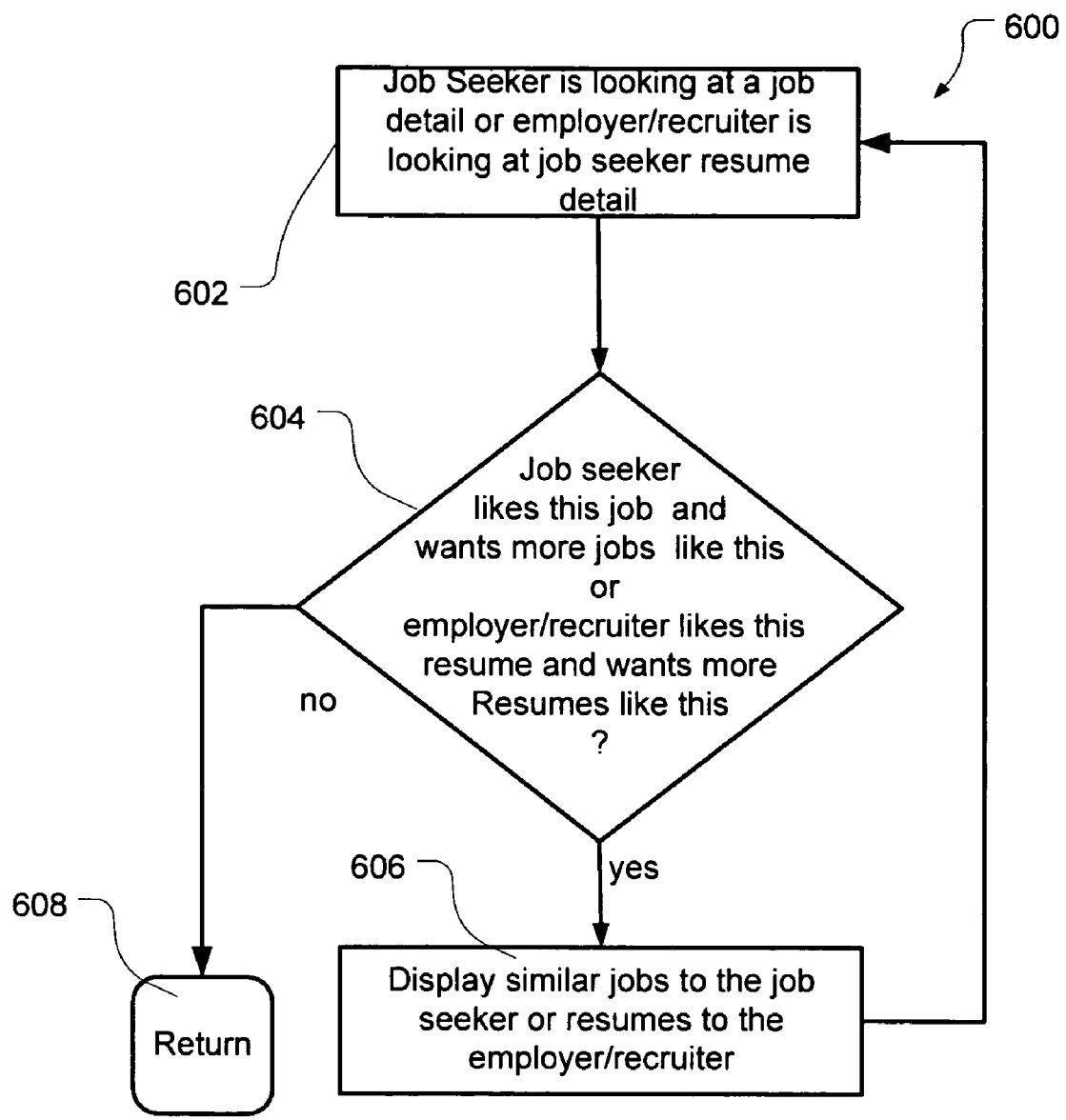
FIG. 6 is a simplified process flow diagram for any user, either a job seeker or an employer/recruiter, utilizing an embodiment of the present disclosure.

Referring now to FIG. 6, a simplified general process flow diagram 600 of one sequence of operations that occur when a job seeker or employer/recruiter signs on to the system 100. In operation 602 the job seeker is presented with, and looks at an exemplary job description. Control then transfers to query operation 604. Here the user is asked whether he likes this job and therefore would like to see more job descriptions like this one. If the user clicks on "yes" or "show me more like this one" etc., then control transfers to operation 606 and the user sees a different screen with a series of different but similar job descriptions. On the other hand, if the user clicks or selects "No," then control transfers to return operation 608 and control returns to the calling operation, whatever it might have been.

Figure 7:
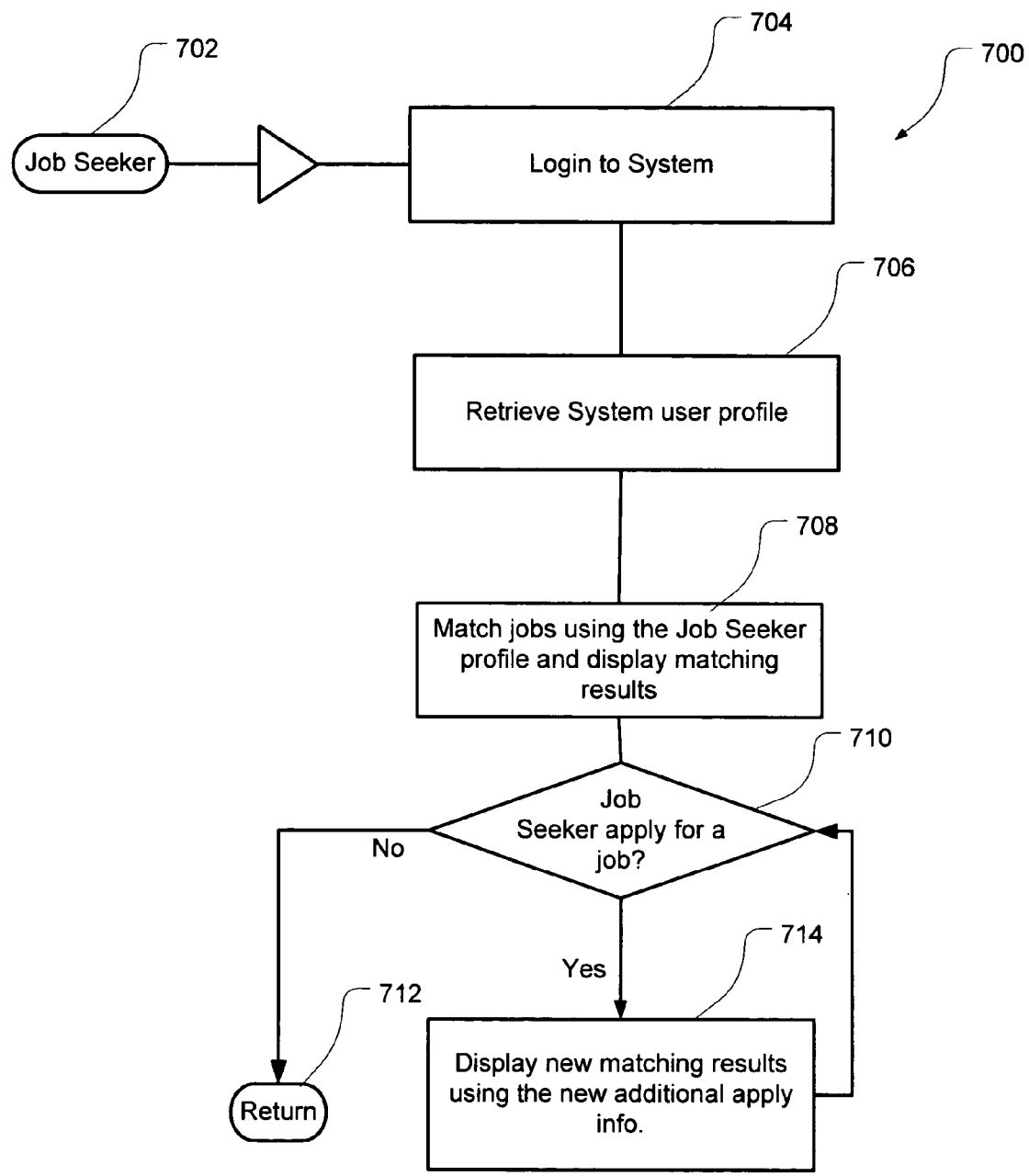
FIG. 7 is an overall process flow diagram for a job search in an exemplary embodiment of the present disclosure in which the job seeker has previously established an identification on the system shown in FIG. 1.
Figure 8:
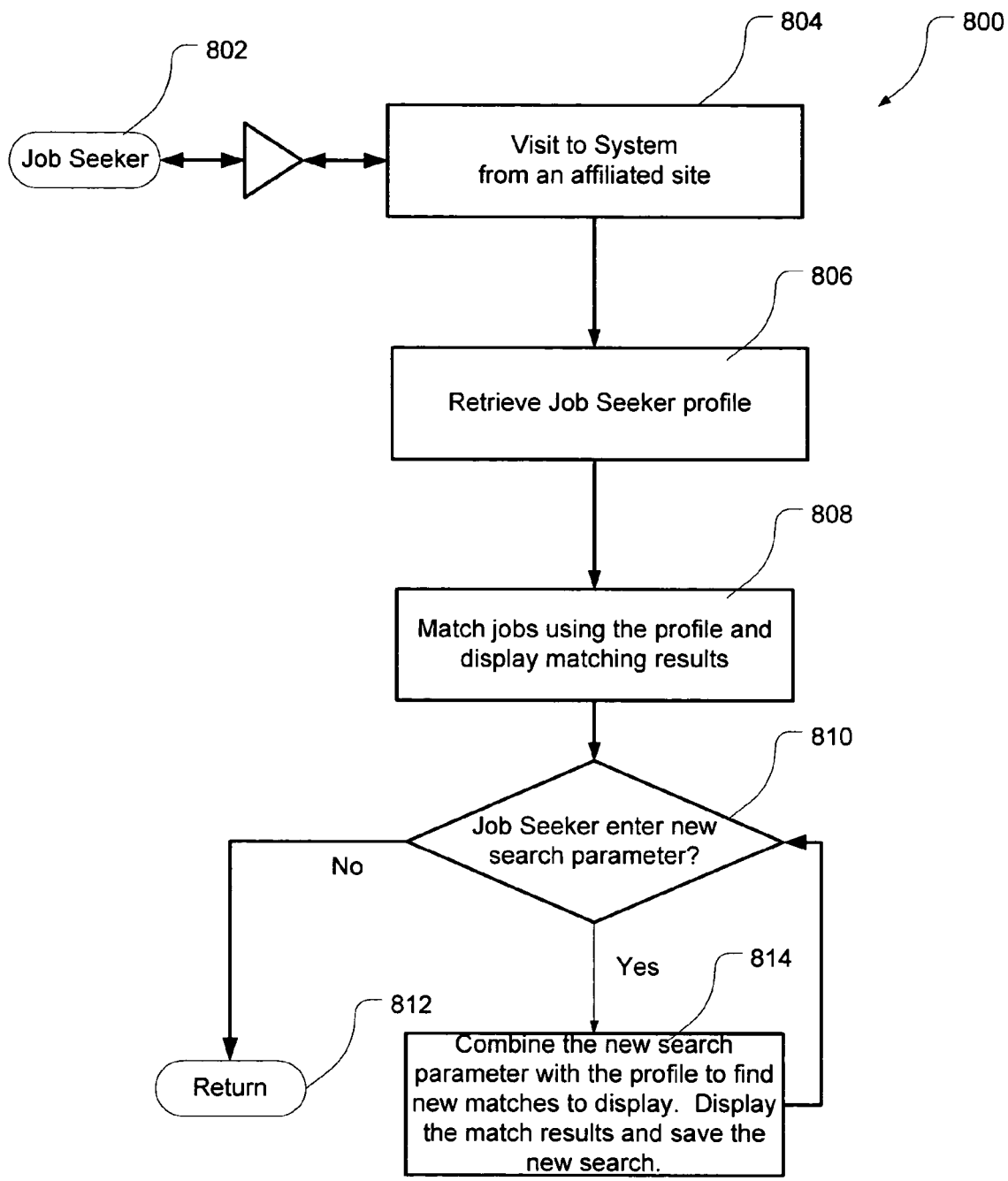
FIG. 8 is a process flow diagram for a job search in an exemplary embodiment of the present disclosure in which the job seeker has identification on an affiliated portal such as a web server, but not an established identification on the system.
Figure 9:
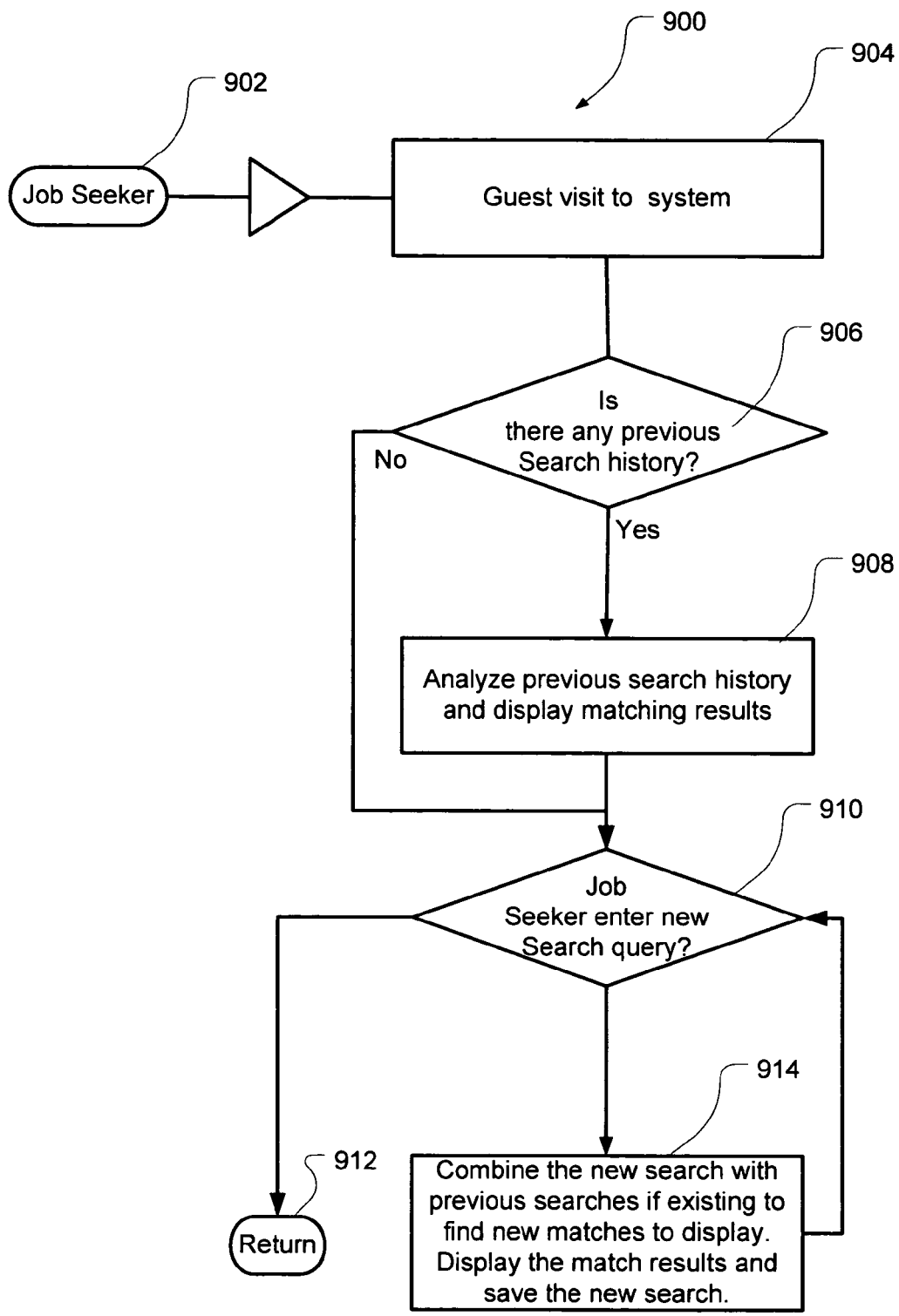
FIG. 9 is a process flow diagram as in FIG. 8 in which the job seeker has no prior identification on an affiliated portal but does have a browser identifier such as a "cookie."
Figure 10:
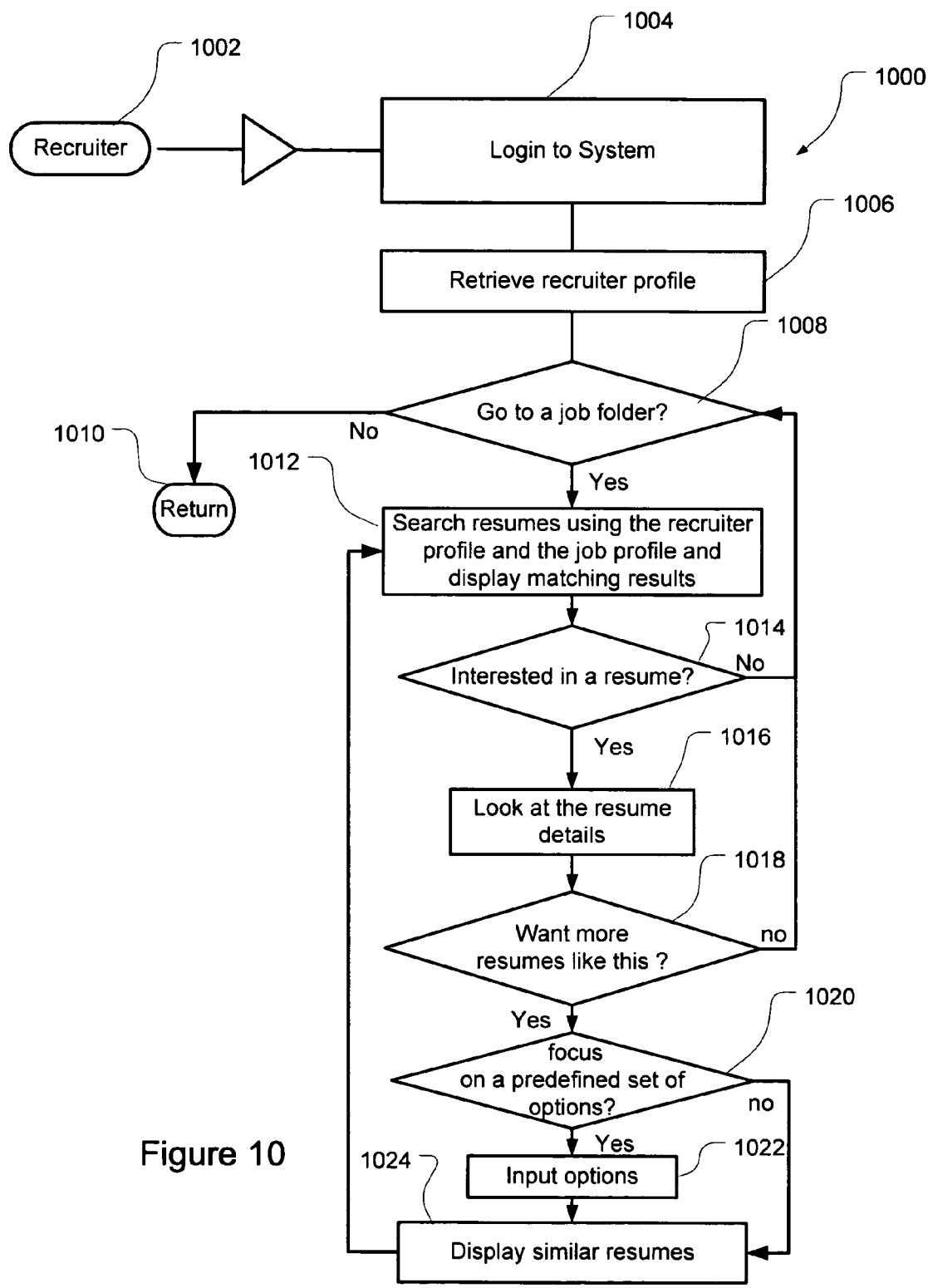
FIG. 10 is a process flow diagram for an employer/recruiter in accordance with an embodiment of the present disclosure.

Specifically for job seekers, several scenarios are shown in FIGS. 7 through 9. FIG. 10 provides an exemplary flow diagram for an employer/recruiter.

FIG. 7 shows a sequence of operations 700 when a job seeker 702 accesses the system 100 and the job seeker is a prior system user with his own login ID. The job seeker 702 enters his ID code in operation 704 to log onto the system 100. When he does so, control transfers to operation 706. In operation 706, the job seeker's user profile 206 is retrieved from the database 104. Control then transfers to operation 708, where the system 100 searches available jobs in module 102 as described above with reference to FIG. 3, and displays the matching results to the job seeker, on a screen similar to that shown in FIG. 4. Control then transfers to operation 710 where the system 100 awaits the job seeker to choose whether to apply for a displayed job. If the job seeker chooses not to apply for a job, control transfers to return operation 712. On the other hand, if the user chooses to apply for one of the jobs, the apply history for the job seeker is updated in the user activity monitoring module 116, and control transfers to operation 714.

In operation 714, since the job seeker has now applied for one of the displayed jobs, a new search through the sequence 300 shown in FIG. 3 is performed, with the updated apply history and click-through information provided as a result of the job seeker's actions. Control then returns to query operation 710, in which the new search results are displayed to the job seeker 702. Again, the job seeker 702 is given the opportunity to apply for one of the displayed jobs and, if he/she does so, control again passes to operation 714, the matching search sequence 300 repeats, and then back to query operation 710. This iterative process repeats until the job seeker chooses not to apply for one of the displayed jobs, at which point control transfers to return operation 712.

FIG. 8 shows a sequence of operations 800 when a job seeker 802 accesses the system 100 and the job seeker is not a prior system 100 user but does have a login ID for the web system on which system 100 resides. Therefore there is some basic information on the job seeker in the database 104 which can be utilized. The job seeker 802 enters his ID code in operation 804 to log onto the system 100. When he does so, control transfers to operation 806. In operation 806, the job seeker's available profile is retrieved from the database 104. This profile will necessarily be more limited than the corresponding profile 206 for the prior user 702.

Control then transfers to operation 808, where the system 100 matches available jobs via module 102 as described above with reference to FIG. 3, with the available profile and displays the matching results to the job seeker 802, again on a screen similar to that shown in FIG. 4. Control then transfers to query operation 810. Query operation 801 of the system 100 permits the job seeker 802 to choose whether to add another search parameter. If the job seeker 802 chooses not to add another search parameter or request a search with different parameters, control transfers to return operation 812. On the other hand, if the job seeker 802 adds or changes a parameter, the click-through history for the job seeker is updated in the user activity monitoring module 116, and control transfers to operation 814.

In operation 814, since the job seeker has now requested a modified search by adding or changing a parameter, a new search through the matching sequence 300 shown in FIG. 3 is performed, with the updated click-through information provided as a result of the job seeker's actions. Control then returns to query operation 810, in which the new search results are displayed to the job seeker 802. Again, the job seeker 802 is given the opportunity to modify parameters for another search, and, if he/she does so, control again passes to operation 814, the matching search sequence 300 repeats, and then back to query operation 810. This iterative process repeats until the job seeker chooses not to apply for one of the displayed jobs, at which point control transfers to return operation 812 where the job seeker cn continue with another search. The principal difference between the exemplary sequences shown in FIGS. 7 and 8 is that the job seeker 802 is not given the opportunity to actually apply for a displayed job through the system 100 until he/she becomes a recognized job seeker as job seeker 702 with a properly generated job seeker profile 206. The job seeker will not be able to be shown a best match until such a profile 206 is generated.

FIG. 9 shows an exemplary sequence of operations 900 when a job seeker 902 accesses the system 100 and the job seeker 902 has no prior history at all either with the system 100 or with a portal such as the web server 105 carrying system 100. Here the job seeker 902 likely has no known ID. The job seeker 902 therefore enters as a visitor in operation 904 to log onto the system 100. When he does so, control transfers to query operation 906. In query operation 906, the job seeker's browser ID is identified using cookies obtained from his browser software to determine whether there are any previous searches for this user. If not, control transfers to query operation 910. However, if there is a previous search retrieved from the database 104, control then transfers to operation 908, where the system 100 searches available jobs in module 102 as described above with reference to FIG. 3, based on the stored prior search results, and displays the matching results to the job seeker 902, again on a screen similar to that shown in FIG. 4. Control then transfers to operation 910 where the system 100 awaits the job seeker 902 to choose whether to conduct a search. If the job seeker chooses not to search, control transfers to return operation 912. On the other hand, if the user chooses to conduct a search, the history for the job seeker 902 is updated, if any from previous searches, in the user activity monitoring module 116, and control transfers to operation 914.

In operation 914, since the job seeker has requested a search, a new search through the matching sequence 300 shown in FIG. 3 is performed, with the updated click-through information provided as a result of the job seeker's actions. Control then returns to query operation 910, in which the new matching results are displayed to the job seeker 902. Again, the job seeker 902 is given the opportunity to modify parameters and request a modified search for jobs and, if he/she does so, control again passes to operation 914, the matching search sequence 300 repeats with the modified parameters, and then control passes back to the query operation 910. This iterative process repeats until the job seeker 902 chooses not to modify the search so as to modify the match, at which point control transfers to return operation 912.

FIG. 10 shows a sequence of operations 1000 when an employer/recruiter 1002 accesses the system 100 and the employer recruiter 1002 is a prior system user with his own employer login ID. The employer/recruiter 1002 enters his ID code in operation 1004 to log onto the system 100. When he does so, control transfers to operation 1006. In operation 1006, the employer/recruiter's user profile 206 is retrieved from the database 104. Control then transfers to query operation 1008. Here, the question is asked whether the employer/ recruiter wishes to retrieve and examine a particular job folder containing jobs he/she has already loaded profiles of and saved. If not, control transfers to return operation 1010. if the employer/recruiter selects a job folder, answering yes in query operation 1008, control transfers to operation 1012.

In control operation 1012 the system 100 searches all the resumes in the database 104 using the recruiter profile and the job profile on file in the job folder, in matching module 102 as described above with reference to FIG. 3, and displays the matching results to the employer/recruiter 1002, on a screen similar to that shown in FIG. 4, except set up for the employer/ recruiter 1002. Control then passes to query operation 1014.

In query operation 1014, the question is asked of the employer/recruiter whether he/she is interested in a particular displayed resume. If so, then control transfers to operation 1016 in which the selected resume is displayed for the employer 1002. If no resume is chosen for display, however, control returns to query operation 1008, where the employer/ recruiter is again asked to go to a job folder, perhaps this time to a different job folder.

Once the employer/recruiter views a resume in operation 1016, control transfers to query operation 1018. Query operation 1018 asks whether the recruiter wants to se other resumes similar to the one shown. If the answer is yes, control transfers to operation 1020. In query operation 1020, the employer/ recruiter is asked whether the next search of similar resumes should included additional predefined options. If so, control transfers to operation 1022 where the employer/recruiter inputs the selected options or qualifications to more narrowly define the search. Control then transfers to operation 1024 where the resumes are again searched with the new input from the predefined set of options, or simply with the click-through history added from the just completed search and the search of resumes is again performed. The results of this research are displayed to the employer/recruiter in operation 1012 again as potential job seeker candidates instead of potential jobs. Control then transfers again to query operation 1014. This iterative process through operations 1012 through operation 1024 is repeated until the employer/recruiter 1002 returns a negative answer in operation 1014 and then in operation 1008 such that control transfers to return operation 1010.

Figure 11:
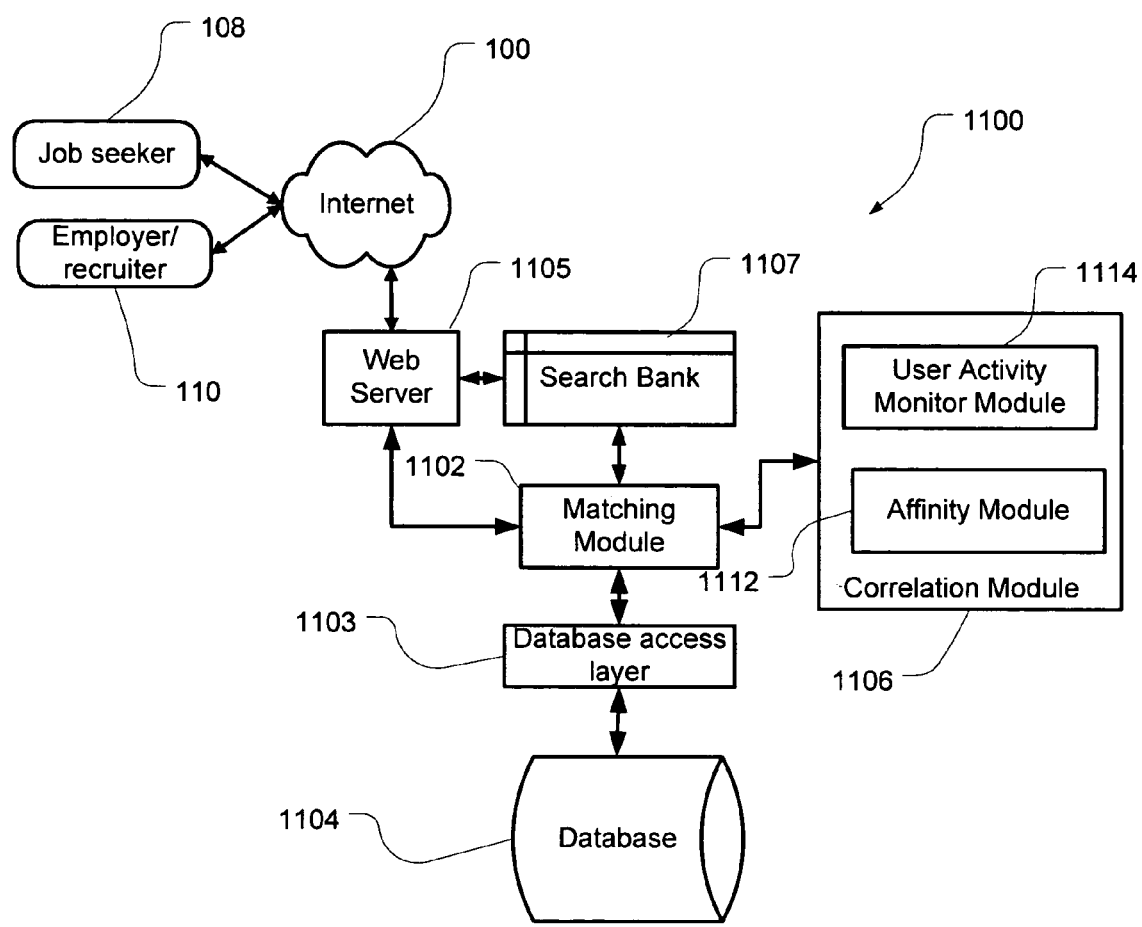
FIG. 11 is an overall view of a simplified system in accordance with another embodiment of the disclosure that utilizes only an affinity module in determination of match results.
Figure 12:
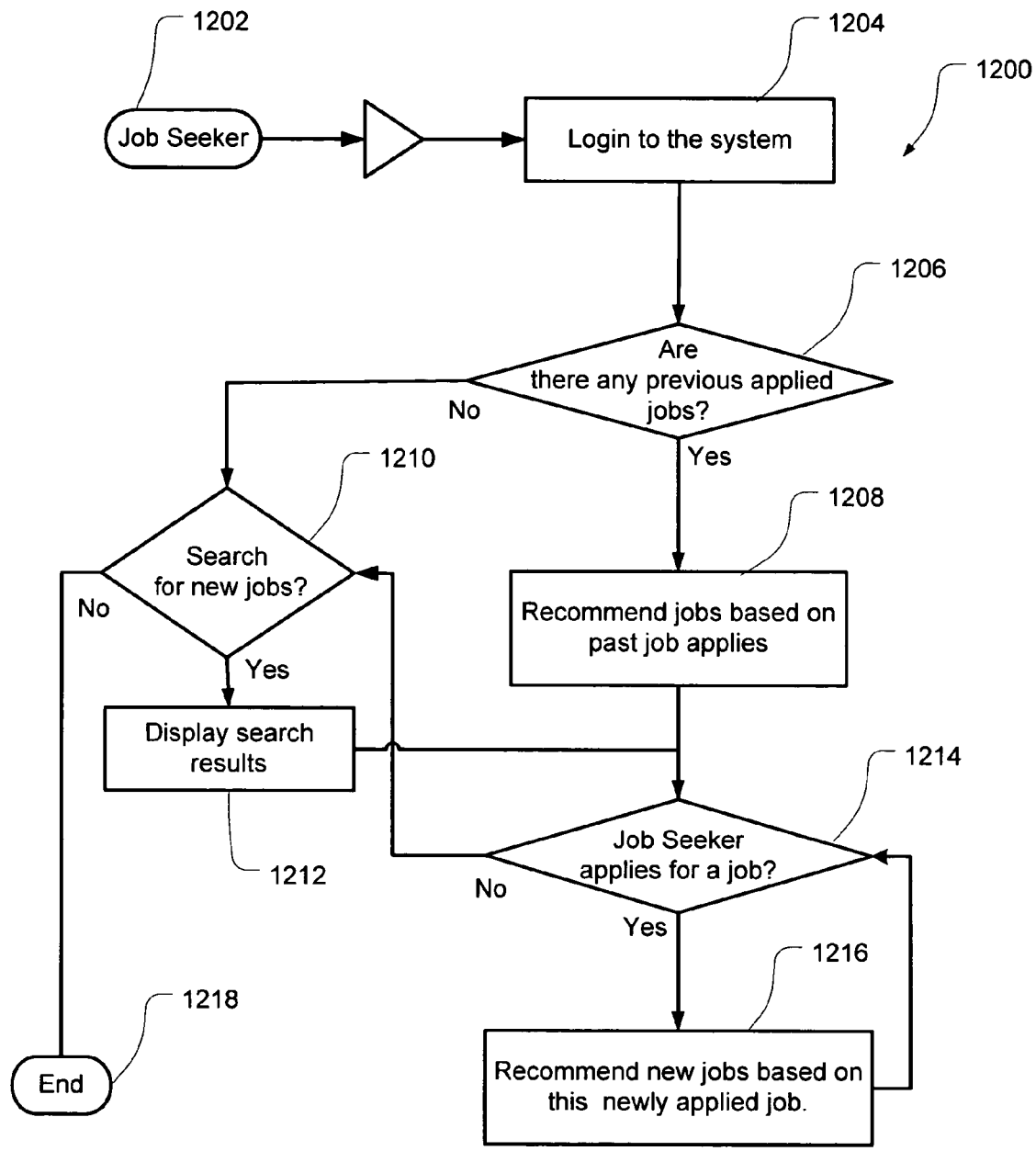
FIG. 12 is a process flow diagram for the simplified system shown in FIG. 11.
Figure 13:
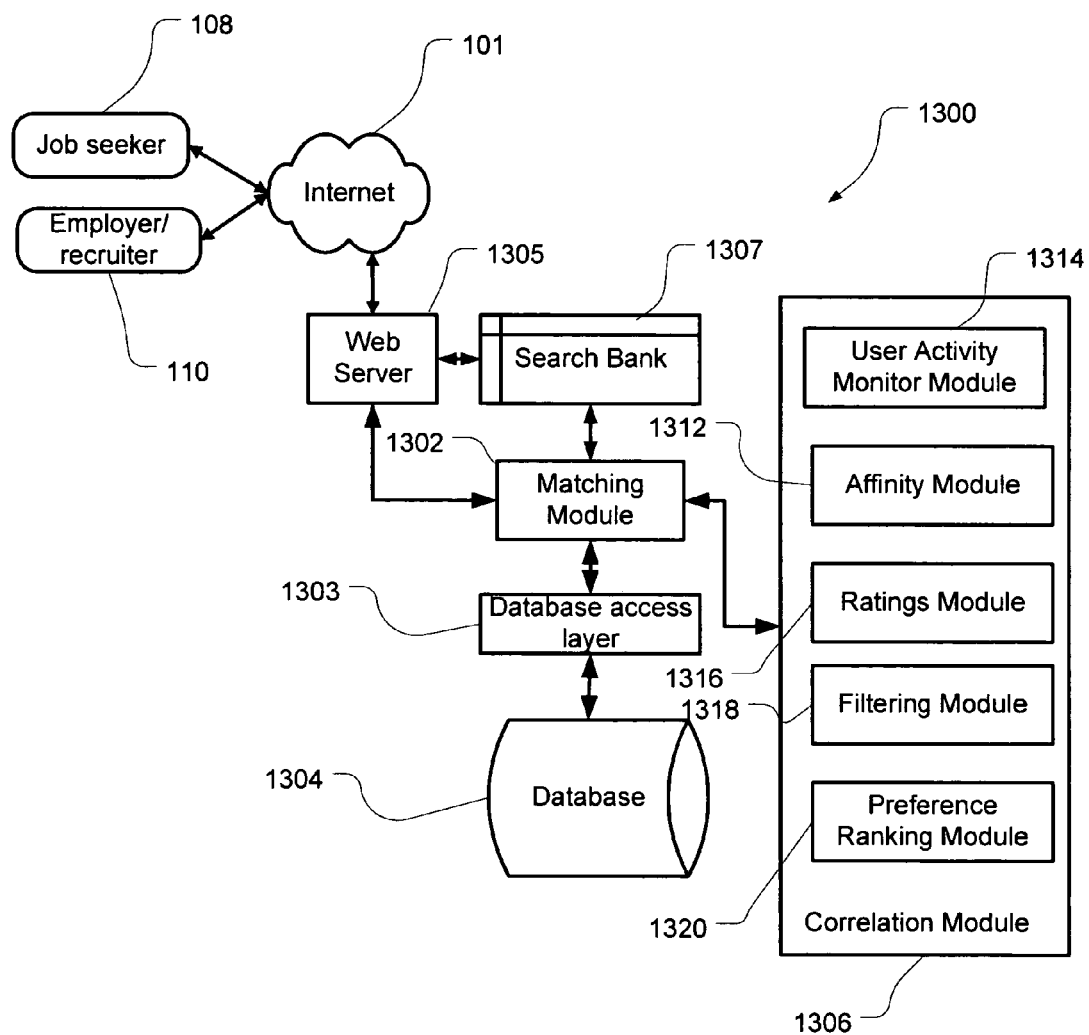
FIG. 13 is an overall view of a more complex system in accordance with another embodiment of the disclosure similar to that shown in FIG. 11 that includes modules to illicit user input to enhance the matching results provided to the user.

Another simplified embodiment of the system in accordance with the present disclosure is illustrated in FIGS. 11 and 12. In this embodiment, the system 1100 includes a matching module 1102, a database 1104, and a correlation module 1106. The matching module 1102 receives information and queries via a job seeker interface module 1108 and employer/recruiter interface module 1110 through accessing a portal such as a web server 1105 typically via the internet 1101.

Throughout this description, primarily an exemplary job seeker will be used to describe system operations. However, this is not the only use of the system 1100. The system 1100 can also be used for example, in a reverse direction, by an employer/recruiter to evaluate candidate job seekers in a similar manner.

The web server 1105 in turn communicates preferably through a search bank 1107 to the matching module 1102 which draws from the correlation module 1106, although the matching module 1102 can communicate directly to and through the web server 1105 to the job seeker module 1108 or the employer/recruiter module 1110. The correlation module 1106 in this embodiment is limited in its content to an affinity engine module 1112 and a user activity monitor Module 1116. The affinity module 1112 provides information and contains routines that look for relationships between job data and job seeker data and draw inferences from the data that correlate with information provided, either directly or indirectly, from the job seeker and/or the employer/recruiter.

The affinity engine module 1112 within the correlation module 1106 generally examines combinations of informational parameters or data to determine whether there are any correlations, i.e. affinities between any of the parameters. Such affinities can relate a job seeker to other job seekers based on, for example, a particular location, a job, skill set, job categories, spatial relationships, etc. Similarly, jobs can also be related to other jobs. In general, the affinity module 1112 is used to identify commonalities and trends between otherwise disparate data. This information can then be utilized to identify alternative jobs to the job seeker or alternative job seeker candidates to an employer/recruiter user of the system 1100 that otherwise might be missed.

The affinity module again preferably can utilize an affinity engine such as is described in U.S. Pat. No. 6,873,996, assigned to the assignee of the present disclosure and hereby incorporated by reference in its entirety. The affinity engine operation in affinity module 1112 to determine the matching score 322 as set forth in FIG. 3 above, can be simply understood with reference to an example set forth in Table 5 discussed in detail above.

The user activity monitor module 1116 tracks, for each job seeker, and each employer/recruiter, his or her prior queries, choices, actions and interactions with the system 1100 so as to be able to draw correlations, e.g., inferences from such actions. For example, a job seeker can apply for one of a number of suggested jobs. This "apply" fact is tracked for potential use in the affinity engine module 1112 to infer other potential matches to offer as suggested jobs. Similarly, an employer/recruiter can examine resumes and indicate an interest in or contact for interview one of a number of suggested job seekers for a particular job. This indicated interest fact is tracked in the user activity monitor module 1116, for use by the affinity engine module 1112 when the employer/recruiter next queries the system 1100.

In this simplified embodiment 1100, the matching is limited in several distinct ways. First, the job location, the job title, and the industry are all identical between the jobs and the job seeker 1102 and thus there is a one to one match on each of these parameters. Second, the matching is only performed utilizing apply history (prior applied for jobs). As mentioned above, in this particular example, the title match score determination operation 306, the industry match score determination operation 310 and the location match score, all referring to FIG. 3, are required to match at a value of one. The results of the match operation are stored in the database 1104.

Third, the affinity module 1112 in this simplified embodiment looks only at other job seekers and other jobs those job seekers have applied for, as is particularly shown in the example set forth in Table 5.

FIG. 12 shows a sequence of operations 1200 when a job seeker 1202 accesses the simplified system 1100 and the job seeker is a prior system user with his own Login ID. The job seeker 1202 enters his ID code in operation 1204 to log onto the system 1100. When he does so, control transfers to operation 1206. In operation 1206, the job seeker's user profile 206 is retrieved from the database 1104. This previously saved profile 206 will contain any records of jobs that the job seeker previously applied for.

If such previously applied for jobs are found, control transfers to operation 1208 where the system 1100 searches and matches available jobs in module 1102 as described above with reference to FIG. 3, and then displays the matching results to the job seeker 1202, on a screen similar to that shown in FIG. 4. Control then transfers to operation 1214 where the system 1100 permits the job seeker to choose to apply for a newly displayed job. If the job seeker chooses not to apply for one of the displayed jobs, control transfers to query operation 1210. On the other hand, if the user chooses to apply for one of the jobs, the apply history for the job seeker is updated in the user activity monitoring module 116, and control transfers to operation 1216.

In operation 1216, since the job seeker has now applied for one of the displayed jobs, a new search and matching operation, through the sequence 300 shown in FIG. 3, is performed with the updated apply history and click-through information provided as a result of the job seeker's actions. The results of this match are displayed as recommendations to the job seeker 1202. Control then returns to query operation 1214. Again, the job seeker 1202 is given the opportunity to apply for one of the newly displayed jobs and, if he/she does so, control again passes to operation 1216, the matching search sequence 300 repeats, and then back to query operation 1214. This iterative process repeats until the job seeker chooses not to apply for one of the displayed jobs, at which point control transfers to operation 1210.

When control transfers to query operation 1210, either from operation 1214 as just described, or initially from query operation 1206, if the stored job seeker profile 206 contains no previous applied for jobs, the job seeker 1202 is permitted to conduct a new search for jobs. In this case, perhaps the job seeker can provide different input parameters for the job search desired, such as a different location, title, etc. If such a new search is requested, control transfers to operation 1212 where the search is conducted and matching results are displayed as potential jobs. Control then passes to query operation 1214 as above described.

On the other hand, if the job seeker 1202 does not want to perform another job search at this time, the job seeker's job profile 206 is updated and stored, and control passes to return operation 1218 in which the current process 1200 terminates. The next time the job seeker 1202 logs into the system 1100, the above described process again begins, but this time with updated information in the job seeker's profile 206 based on the previously applied for jobs and correlations determined in the affinity module 112 described above.

Another more complex embodiment of a system in accordance with the present disclosure is illustrated in FIGS. 13 through 17. This embodiment provides improved functionality and usability for the user, whether job seeker or employer/recruiter, in order to more efficiently and transparently narrow search results in a manner useful to the user. Throughout the description of this embodiment, an exemplary job seeker will be used primarily to describe system operations. However, this is not the only use of the system 1300. The system 1300 can also be used for example, in a reverse direction, by an employer/recruiter to evaluate candidate job seekers in a similar manner.

In this embodiment, the system 1300 includes a matching module 1302, a database 1304, and a correlation module 1306 as in the embodiments described above. The matching module 1302 receives information and queries via a job seeker interface module 108 and employer/recruiter interface module 110 through accessing a portal such as a web server 1305 typically via the internet 101.

The web server 1305 in turn communicates preferably through a search bank 1307 to the matching module 1302 which draws from the correlation module 1106, although the matching module 1302 can communicate directly to and through the web server 1305 to the job seeker module 108 or the employer/recruiter module 110. The correlation module 1306 in this embodiment is not limited in its content to an affinity engine module 1312 and a user activity monitor Module 1316. The affinity module 1312 provides information and contains routines that look for relationships between job data and job seeker data and draw inferences from the data that correlate with information provided, either directly or indirectly, from the job seeker and/or the employer/recruiter.

The affinity engine module 1312 within the correlation module 1306 generally examines combinations of informational parameters or data to determine whether there are any correlations, i.e. affinities between any of the parameters. Such affinities can relate a job seeker to other job seekers based on, for example, a particular location, a job, skill set, job categories, spatial relationships, etc. Similarly, jobs can also be related to other jobs. In general, the affinity module 1312 is used to identify commonalities and trends between otherwise disparate data. This information can then be utilized to identify alternative jobs to the job seeker or alternative job seeker candidates to an employer/recruiter user of the system 1300 that otherwise might be missed.

The affinity module again preferably can utilize an affinity engine such as is described in U.S. Pat. No. 6,873,996, assigned to the assignee of the present disclosure and hereby incorporated by reference in its entirety. The affinity engine operation in affinity module 1312 to determine the matching score 322 as set forth in FIG. 3 above, can be simply understood with reference to an example set forth in Table 5 discussed in detail above.

The user activity monitor module 1314 tracks, for each job seeker, and each employer/recruiter, his or her prior queries, choices, actions and interactions with the system 1300 so as to be able to draw correlations, e.g., inferences from such actions. For example, a job seeker can apply for one of a number of suggested jobs. This "apply" fact is tracked for potential use in the affinity engine module 1312 to infer other potential matches to offer as suggested jobs. Similarly, an employer/recruiter can examine resumes and indicate an interest in or contact for interview one of a number of suggested job seekers for a particular job. This indicated interest fact is tracked in the user activity monitor module 1314, for use by the affinity engine module 1312 when the employer/recruiter next queries the system 1300.

The correlation module 1306 in this embodiment also includes a ratings module 1316, a filtering module 1318, and a preference ranking module 1320, all designed to assist a user, whether she be job seeker or employer/recruiter, by personalizing the system to make it more transparent and effective for the user.

In this embodiment 1300, the functionality of the matching is less limited in several distinct ways from that of embodiment 1100 described above. First, the job location, the job title, and the industry may differ between the jobs and the job seeker 102 and thus there is not necessarily a one to one match on each of these parameters. Second, the matching is performed utilizing apply history (prior applied for jobs) as well as several input parameters received from interaction from the user. As mentioned above, in the previous example, the title match score determination operation 306, the industry match score determination operation 310 and the location match score, all referring to FIG. 3, may match at a value of one. The results of the match operation are stored in the database 1304.

Second, the job ratings module 1316, the filtration module 1318, and the performance ranking module 1320 all contribute to the functionality of the user activity monitor module 1314.

Third, the affinity module 1312 in this embodiment looks at other job seekers and other jobs those job seekers have applied for, as is particularly shown in the example set forth in Table 5 and, in addition, evaluates user input received from a ratings module 1316, a filtering module 1318, and a preference ranking module 1320. Each of these modules provides input to the affinity module 1312, and, in turn, the matching module 1302, in response to interaction between the Job Seeker and the system 1300 as illustrated in the accompanying flow diagram of FIG. 14 below. This interaction between the system and the job seeker provides a personalized aspect to the system 1300 that is absent from the system shown in FIG. 11. Hence this embodiment 1300 gives the job seeker an enhanced transparency experience that efficiently leads to the type of results that he or she may be searching for.

For example, an additional database called "LDB" may be incorporated into database 1304. This LDB database provides preference information determined in response to queries made to the user in the user's profile. These preferences may include: location_preference, type_preference, title_preference, industry_preference, experience_preference. Each field has the same data structure:

Field value=record^Arecord^Arecord^Arecord . . . .

Record=value^Bimportance_score . . . .

Where ^A and ^B are delimiters. ^A separates records and ^B separates fields within a record. This information may be stored in other data structures and/or data storages such as an Oracle database. For example, location_preference field could have the following value:

Sunnyvale-CA-USA^B5^ANew York-NY-USA^B-5^AChicago-IL-USA^B-0

Here 5 applied jobs have the location Sunnyvale, Calif., USA and none of the "not-interested-jobs" has this location. 5 "not-interested-jobs" have the New York location and none of the applied jobs is located in New York. The significance of –0 for Chicago is that the user explicitly said he/she did not like Chicago. If it was "0" for Chicago, then it would mean that the user explicitly said he/she liked Chicago.

The following is an example for the type_preference field:

PERM^B6^ACONT^B-5^ATEMP-0

Similarly, for title, a standard set of titles may be defined along with user specified not-interested titles. For industries, preferably standard industry codes are used. For company names, variations of names are encompassed. For experience level, a numerical span of years is utilized.

As an example of information collection from the user, whether job seeker 108 or employer/recruiter 110, the following description is exemplary. When a job seeker 108 clicks "No Interest" on a displayed job, a popup small window may be displayed asking the job seeker 108 what he/she does not like about this job, with a series of predefined descriptions provided. For example, "I don't like the title", "I don't like the location", "I don't like the industry", "I don't like the company" may be used. If the user does or does not check any of these descriptions, that fact is saved as a user preference for use in the user activity module 1314, the affinity module 1312, and the matching module 1302.

When a user expresses no interest in a particular displayed job, the system 1300 learns from that. As mentioned previously, attributes are defined that enable the job seeker to focus on such as "title", "location", "industry", "company", "type of job". These attributes are combined with saved searches, applied for jobs, and not-interested jobs. Lists of predefined attributes for applied for jobs and disliked jobs are compared in order to cull common attribute values to create two hash maps. One is a positive map that contains any attribute-value pairs that are in the applied list but not in the disliked list. The other is a negative map that contains any attribute-value pairs that are in the disliked list but not in the applied list. The two maps can then be the basis for preference ranking analysis.

Positive ranking utilizes commonality of attribute-value pair to rank recommended jobs. For example, if location_Sunnyvale is the most common pair among the applied for jobs, recommendation of jobs with location "Sunnyvale" should be presented to the job seeker first, i.e., on the top.

Negative ranking is similarly accomplished using commonality of attribute-value pairs to filter jobs. For example, if location_Sunnyvale is the most common pair in the disliked jobs list, then the system 1300 may filter out all jobs with location "Sunnyvale", or at least place them last in the presentation to the job seeker 108.

Figure 17:
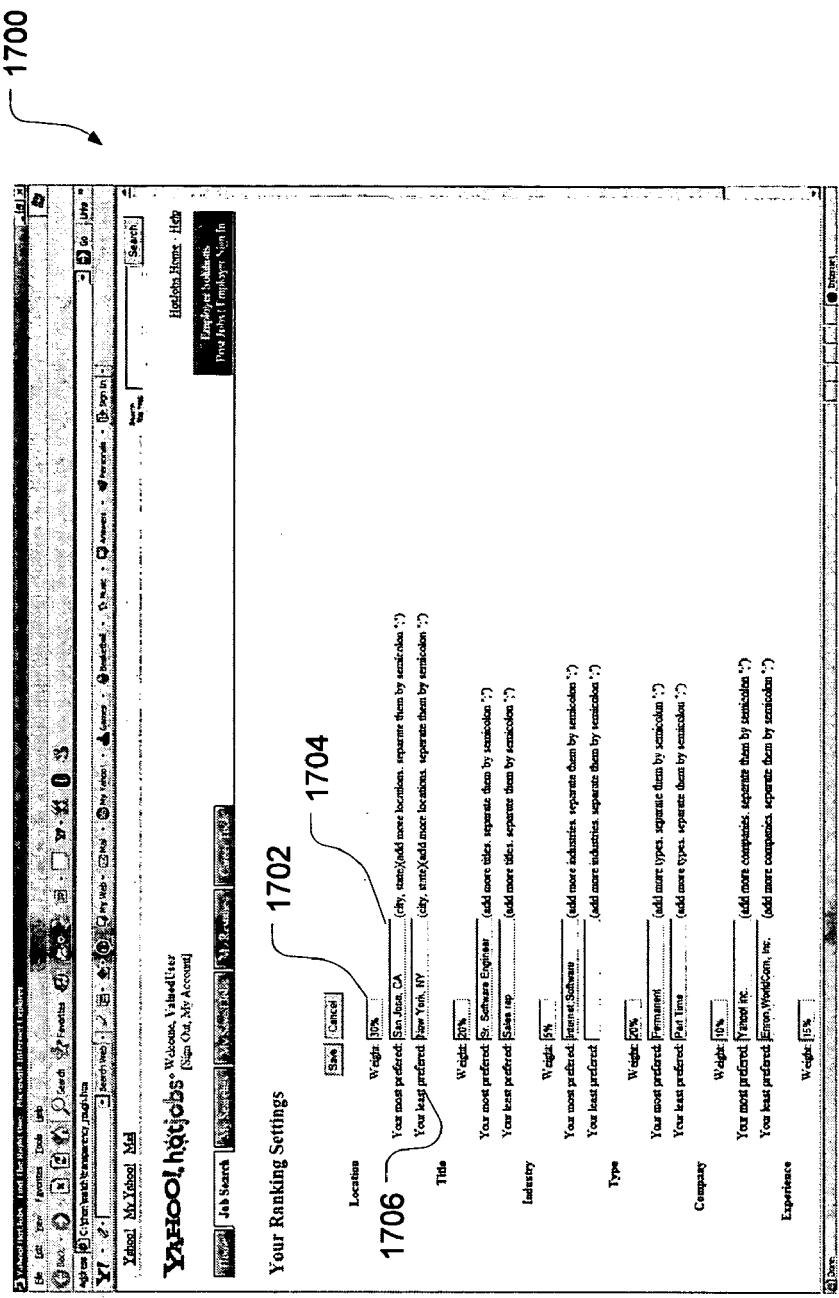
FIG. 17 is a screen shot of a user interface presented to a job seeker to set ranking preferences in accordance with the disclosure.

An example of a user preference ranking setting screen 1700 is shown in FIG. 17. Each of the major categories, location, title, industry, job type, company, and experience level is shown along with a weighting factor 1702, a most preferred parameter 1704, and a least preferred parameter 1706. As an example, note that location for this user is weighted at 30%, while all of the other parameters are weighted less. If the job seeker now decides that he/she wants to zero in on the title of the job rather than its location, she could change the title weight to 30% while reducing one of the other categories. Note that the sum of the weights must equal 100%. Thus if the location is the most important category, and ALL other criteria are of no significance, one could even weight Location as 100% and all others as 0%. The jobs displayed would then all be ranked first according to the most preferred location to least preferred, with no weight being given to title, industry, type, company or experience level.

As a job seeker utilizes the system 1300, at any time he or she may access her preferences pages. The ranking settings page shows each of the major categories and provides the user with an opportunity to change each of the three parameters associated with each category. The ranking settings govern how the system displays results to the job seeker 108 or employer/recruiter 110. The preference ranking module 1320, filtration module 1318 and ratings module may be utilized alone or together to provide a more transparent and personalized job search system to the user than the simplified version 1100 described with reference to FIG. 11 above. In this more advanced system 1300, when the job seeker 108 first signs in, he/she may be directed to the preferences screen where he or she is presented with explanations as to how the user can enhance their search results. In addition, each time a search is made, the interactions, preferences and results are incorporated by the affinity module 1312 and user activity monitor module 1314 in order to continually refine the strategy for search and presentation of search results to the job seeker 108 or employer/recruiter 110.

Figure 14:
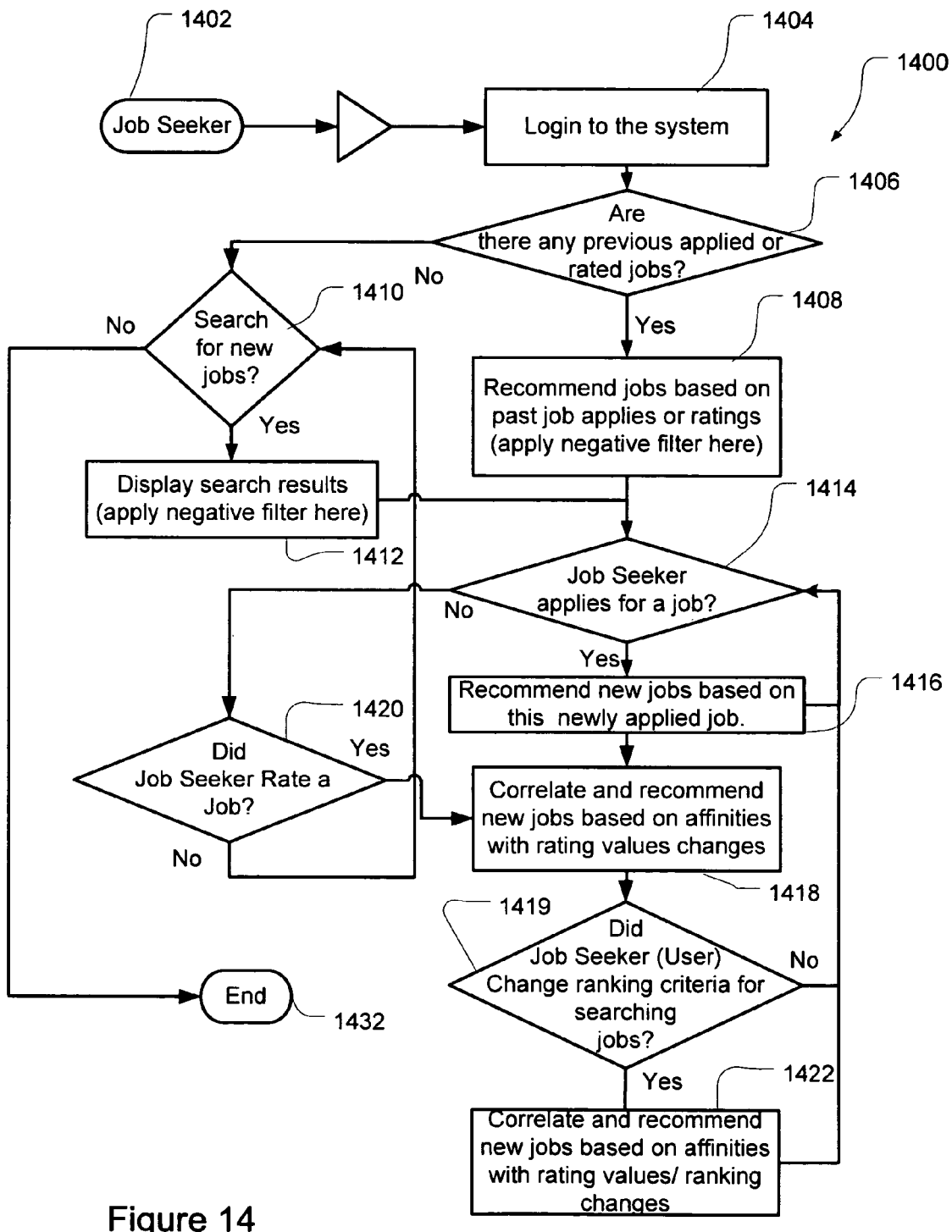
FIG. 14 is a process flow diagram of the method using the system in accordance with the embodiment shown in FIG. 13.

FIG. 14 shows an enhanced sequence of operations 1400 when a job seeker 1402 accesses the system 1300 and the job seeker is a prior system user with his own Login ID. The job seeker 1402 enters his ID code in operation 1404 to log onto the system 1300. When he does so, control transfers to operation 1406. In operation 1406, the job seeker's user profile 206 is retrieved from the database 1304. This previously saved profile 206 will contain any records of jobs that the job seeker previously applied for, along with previously saved personal preferences. If the job seeker 108 wishes to change preferences, such as ranking settings, he/she may be presented with a display screen 1700 in which the previously saved settings may be modified as described above.

Figure 16:
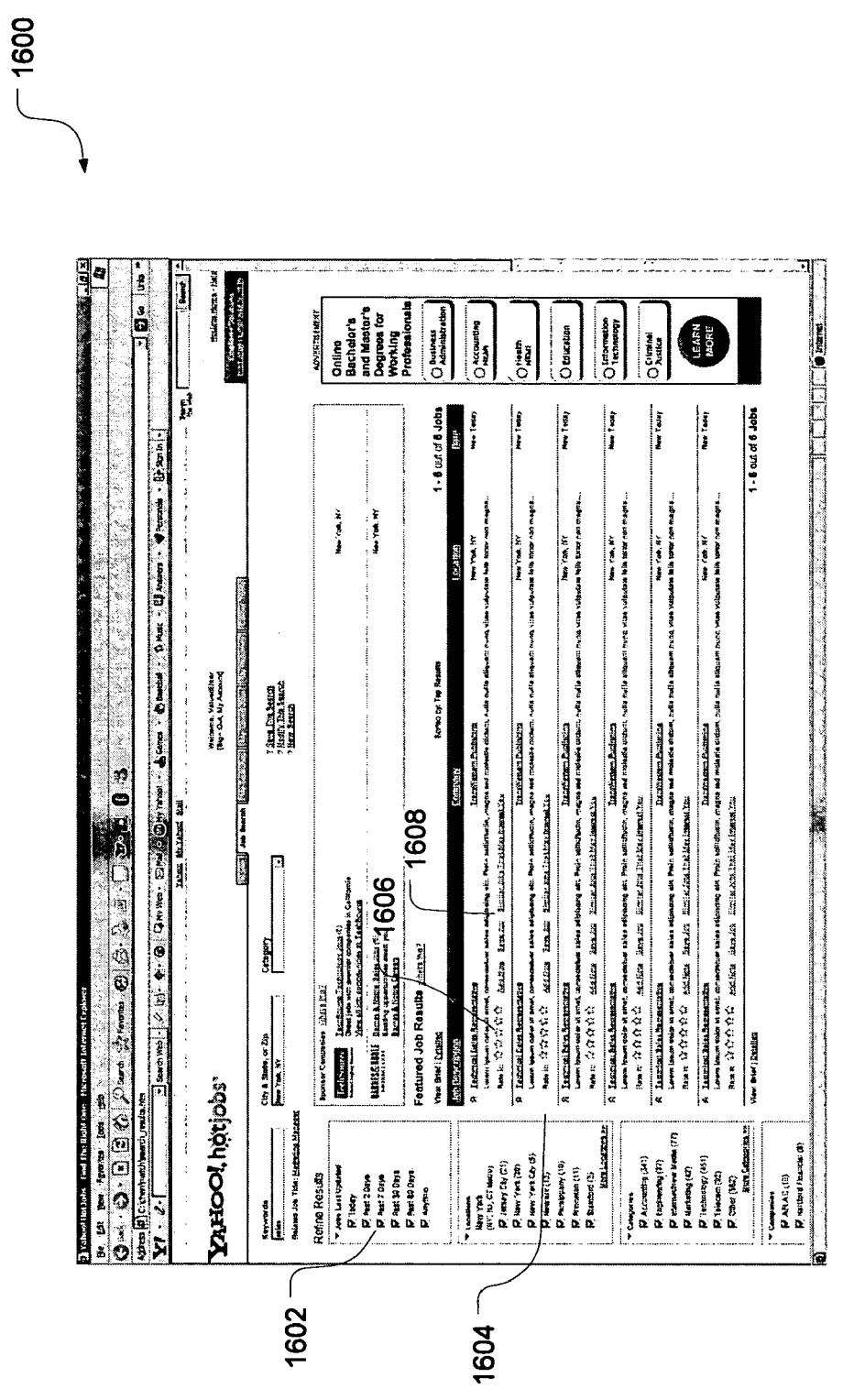

If previously applied for jobs are found, control then transfers to operation 1408 where the system 1300 searches and matches available jobs in module 1302 as described above with reference to FIG. 3, and then displays the matching results to the job seeker 1402, on a screen 1600 such as is shown in FIG. 16 after applying any prior negative filtration selections.

Figure 15:
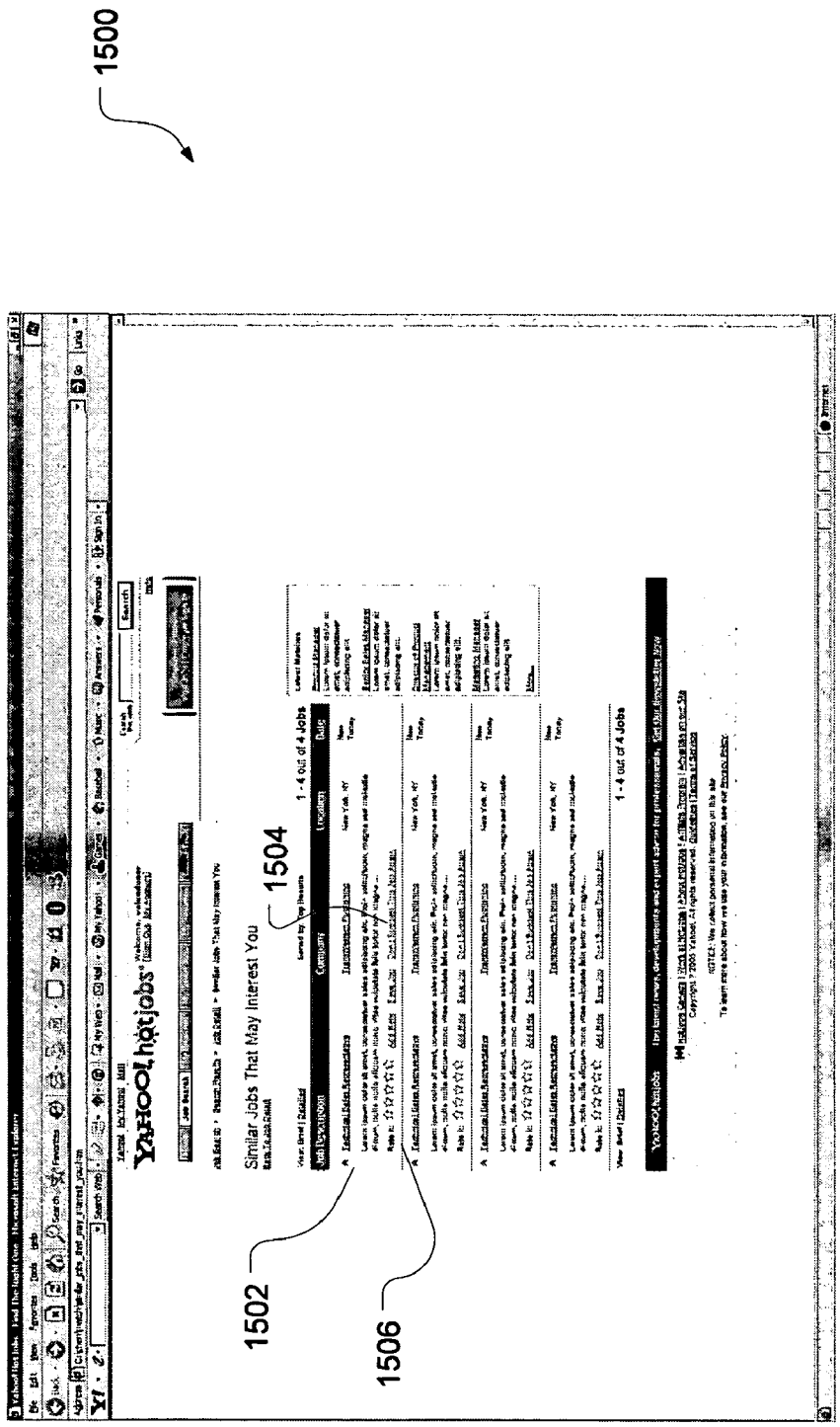
FIG. 15 is a screen shot of a user interface presented upon a user selecting similar jobs.

Screen 1600 displays featured job results 1604, based on previously defined job searches as shown by boxes checked in the last search 1602. The results 1604 are shown based on prior ranking parameters as shown on screen 1700 in FIG. 17. In the screen 1600, an opportunity is provided for the job seeker to rate the jobs presented on a scale of 1-5, indicated by stars 1606. In addition, on screen 1600, the job seeker can look at similar jobs by clicking on "similar jobs that may interest you" 1608. If the job seeker clicks on this icon 1608, a listing of similar jobs 1500 appears as is shown in FIG. 15. The job seeker 1402 can then apply a negative filter for subsequent searches by clicking on "Don't suggest this job again" 1502. This applies a negative filter into the user activity monitor module 1314 and the affinity module 1312.

Control then transfers to operation 1414 where the system 1300 permits the job seeker 1402 to choose to apply for a newly displayed job. If the job seeker chooses not to apply for one of the displayed jobs, control transfers to query operation 1410. On the other hand, if the user chooses to apply for one of the jobs, the apply history for the job seeker 1402 is updated in the user activity monitoring module 1314, and control transfers to operation 1416.

In operation 1416, since the job seeker has now applied for one of the displayed jobs, a new search and matching operation, through the sequence 300 shown in FIG. 3, is performed with the updated apply history and click-through information provided as a result of the job seeker's actions. The results of this match are displayed as recommendations to the job seeker 1402 as shown in FIG. 16. Control then returns to query operation 1414. Again, the job seeker 1402 is given the opportunity to apply for one of the newly displayed jobs and, if he/she does so, control again passes to operation 1416, the matching search sequence 300 repeats, and then back to query operation 1414. This iterative process repeats until the job seeker chooses not to apply for one of the displayed jobs, at which point control transfers to operation 1420. In operation 1420, the query is made whether the job seeker rated one or more of the jobs displayed. If so, control transfers to operation 1418, where new jobs are recommended based on this new information. Control then transfers to query operation 1419.

In operation 1419, the query is made whether the job seeker 1402 has changed ranking criteria for searching jobs. if not, control transfers back to operation 1414. If the job seeker 1402 has changed criteria, then control transfers to operation 1422.

In operation 1422, new jobs are presented based on rating and/or ranking changes. Control then transfers again to operation 1414 where the system awaits the job seeker to apply for a job, change a rating, or ask for similar results as described above. If no jobs are re-rated by the job seeker 1402 in operation 1420, control transfers back to operation 1410.

When control transfers to query operation 1410, either from operation 1420 as just described, or initially from query operation 1406, the job seeker 1402 is permitted to conduct a new search for jobs. In this case, perhaps the job seeker can provide different input parameters for the job search desired, such as a different location, title, etc. If such a new search is requested, control transfers to operation 1412 where the search is conducted and matching results are displayed as potential jobs, including elimination of jobs for which a negative response has been provided. Control then passes to query operation 1414 as above described.

On the other hand, if the job seeker 1402 does not want to perform another job search at this time, the job seeker's job profile 206 is updated and stored, and control passes to end operation 1432.

The next time the job seeker 1402 logs into the system 1300, the above described process again begins, but this time with updated information in the job seeker's profile 206 based on his/her prior actions, preferences set, the previously applied for jobs and correlations determined in the affinity module 1312 described above. In this way, the system 1300, as well as is the case with each of the systems explained above, continually updates itself and is continually refined, both by the user's preferences, and by the user's actions. In addition, the system 1300 is continually updated based on other user's activities impact the affinity module, such that the system 1300 remains a dynamic system responsive to both the user and other user input. In this way the system 1300 is constantly changing and being updated such that the user perceives a dynamic job search system that keeps abreast of changes in the job marketplace as it is being utilized.

The embodiments described above are exemplary and are not to be taken as limiting in any way. They are merely illustrative of the principles of the disclosure. Various changes, modifications and alternatives will be apparent to one skilled in the art Accordingly, it is intended that the art disclosed shall be limited only to the extent required by the appended claims and the rules and principles of applicable law.

We claim:

1. A system comprising:
   a database comprising data related to a plurality of job seekers and/or a plurality of jobs;
   a matching module executed on a computer and in communication with the database, the matching module producing matching results by matching one of the job seekers to a potential job through finding one or more common parameters between job seeker parameters from the one job seeker and one or more job parameters; and
   a correlation module executed on the computer and in communication with the matching module, the correlation module determining a correlation between one of the common parameters and one or more jobs of the plurality of jobs, wherein the correlation module includes a ranking module operable to permit one job seeker accessing the system to assign ranking preferences to one or more of a plurality of the parameters considered in the correlation module to enhance the potential job recommendations provided in the matching results downloadable to the one job seeker, and
   wherein the correlation module has an affinity engine operable to determine alternative jobs to the matching results based on jobs applied for by the plurality of job seekers.

2. The system according to claim 1 wherein the matching module determines a matching score for each of the common parameters between the one job seeker and the one or more jobs.

3. The system according to claim 2 wherein suggestion jobs are arranged according to the ranking of matching scores for download to the job seeker.

4. The system according to claim 1 wherein the correlation module considers the ranking for correlation of subsequent matching suggestion jobs.

5. A method comprising:
   building a job seeker profile of job seeker parameters in response to job seeker Input;
   in response to a job seeker query, producing matching results by matching the job seeker to one or more potential jobs through finding one or more common parameters between job seeker parameters and job description parameters;
   determining, by a computer, alternative jobs to the matching results based on an affinity between the one or more potential jobs identified in the matching results and other job seekers interest in the one or more potential jobs and based on a preference ranking of one or more of the parameters provided by the job seeker; and
   making the matching results and the alternative jobs available for downloading for consideration by the job seeker.

6. The method according to claim 5 further comprising determining a matching score for each of the common parameters between the job seeker and the identified potential jobs.

7. The method according to claim 5 further comprising determining an affinity relevance value for each alternative job based on a popularity of the alternative job.

8. The method according to claim 7 further comprising ranking the alternative jobs according to the affinity relevance value.

9. The method according to claim 5 further comprising:
   querying the job seeker for a change to one or more of the preference rankings, then re-determining subsequent matching results.

10. The method according to claim 9 further comprising storing the preference rankings in a personal profile for the job seeker.

11. The method according to claim 10 wherein each parameter for which a preference ranking is provided is also provided with a weighting factor.

12. The method according to claim 11 wherein a sum of all weighting factors for parameter preferences equals 100%.

13. A method comprising:
   storing one or more job seeker parameters in response to job seeker input by each of a plurality of job seekers;
   storing job parameters in response to input by an employer/recruiter for each of one or more jobs;
   in response to a query from one of the job seekers, finding one or more common parameters between the one job seeker's parameters and the stored job parameters to produce matching job results;

correlating, by a computer, one or more matching job parameters in the matching job results with other jobs based on stored other job seeker parameters;

determining, by the computer, alternative jobs to the matching jobs from correlation data;

receiving a weighting factor from one of the job seekers associated with one or more of the job parameters; and permitting the one job seeker to provide a most preferable value for one or more job of the job parameters.

14. The method according to claim 13 further comprising permitting the job seeker to provide a least preferable job parameter and re-correlate matching job parameters to determine alternative jobs for retrieval by and display to the job seeker.

15. The method according to claim 13 further comprising repeating the storing, finding, correlating, determining and querying operations if the one job seeker applies for one of the displayed alternative jobs.

16. The method according to claim 13 wherein the other job seeker parameters include jobs that the other job seekers applied for.

17. A system comprising:

means for storing job seeker parameters in response to job seeker input by each of a plurality of job seekers;

means for storing job parameters in response to input by an employer/recruiter for each of one or more jobs;

means for, in response to a query from one of the job seekers, finding one or more common parameters between the one job seeker's parameters and the stored job parameters to produce matching results comprising matching jobs;

means for correlating between one or more matching job parameters and the stored job seeker parameters of one or more of the other job seekers to produce alternative jobs;

means for querying the one job seeker for job parameter ranking preferences; and means for updating the matching results and the alternative jobs for consideration by the one job seeker.

18. The system according to claim 17 further comprising means for querying the job seeker to modify a preference weighting factor associated with each job parameter ranking preference.

19. The system according to claim 17 wherein the means for correlating comprises an affinity module that determines affinities based on jobs applied for data for each of the plurality of job seekers.

* * * * *